United States Patent
Katayama

(10) Patent No.: US 7,647,150 B2
(45) Date of Patent: Jan. 12, 2010

(54) VEHICLE ATTITUDE CONTROL DEVICE BASED ON STABILITY FACTOR

(75) Inventor: Yoshio Katayama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 542 days.

(21) Appl. No.: 11/176,374

(22) Filed: Jul. 8, 2005

(65) Prior Publication Data

US 2006/0169522 A1 Aug. 3, 2006

(30) Foreign Application Priority Data

Jul. 14, 2004 (JP) ............................. 2004-207153

(51) Int. Cl.
*B62D 6/00* (2006.01)
(52) U.S. Cl. ........................... 701/43; 701/72; 180/422
(58) Field of Classification Search .................... 701/43
See application file for complete search history.

(56) References Cited

U.S. PATENT DOCUMENTS

| | | | | |
|---|---|---|---|---|
| 4,809,181 A * | 2/1989 | Ito et al. | ........................ | 701/70 |
| 5,005,916 A * | 4/1991 | Fujioka et al. | ............... | 303/137 |
| 5,150,298 A * | 9/1992 | Fujioka et al. | ................ | 701/79 |
| 5,276,624 A * | 1/1994 | Ito et al. | ........................ | 701/72 |
| 5,471,388 A * | 11/1995 | Zomotor et al. | ............... | 701/36 |
| 5,735,584 A * | 4/1998 | Eckert | ......................... | 303/140 |
| 5,934,769 A * | 8/1999 | Brachert et al. | .............. | 303/146 |
| 6,272,418 B1 * | 8/2001 | Shinmura et al. | .............. | 701/72 |
| 6,289,281 B1 * | 9/2001 | Shinmura et al. | ........... | 701/301 |
| 6,374,162 B1 * | 4/2002 | Tanaka et al. | ................. | 701/1 |
| 6,438,474 B1 * | 8/2002 | Tanaka et al. | ................. | 701/41 |
| 6,584,397 B2 * | 6/2003 | Tanaka et al. | ................. | 701/70 |
| 6,622,073 B2 * | 9/2003 | Tanaka et al. | ................. | 701/38 |
| 6,941,212 B2 * | 9/2005 | Sakata | ......................... | 701/72 |
| 7,031,808 B2 * | 4/2006 | Tanimoto et al. | ............... | 701/1 |
| 2002/0087247 A1 * | 7/2002 | Tanaka et al. | ................. | 701/70 |
| 2002/0153770 A1 * | 10/2002 | Matsuno et al. | ............. | 303/146 |
| 2004/0002795 A1 * | 1/2004 | Tanimoto et al. | ............... | 701/1 |
| 2005/0102085 A1 * | 5/2005 | Sakata | ......................... | 701/72 |
| 2006/0169522 A1 * | 8/2006 | Katayama | .................... | 180/421 |
| 2006/0273657 A1 * | 12/2006 | Wanke et al. | ............... | 303/146 |

FOREIGN PATENT DOCUMENTS

JP 10-258720 9/1998

* cited by examiner

*Primary Examiner*—Thomas G Black
*Assistant Examiner*—Shelley Chen
(74) *Attorney, Agent, or Firm*—Buchanan Ingersoll & Rooney PC

(57) ABSTRACT

A vehicle attitude control device derives a stability factor during turning of a vehicle based on the behavior of the vehicle to take the derivation result as an estimated stability factor (step 112), compares the estimated stability factor with a reference stability factor (steps 114 and 116), varies an attitude control necessary-or-not judgment sensitivity based on the comparison result (steps 118, 130 and 134), and executes the attitude control for the vehicle (step 126).

11 Claims, 10 Drawing Sheets

US 7,647,150 B2

VEHICLE ATTITUDE CONTROL DEVICE BASED ON STABILITY FACTOR

This application claims priority under 35 U.S.C. 119 with respect to Japanese Application No. 2004-207153 filed on Jul. 14, 2004.

BACKGROUND OF THE INVENTION

1. Field of the Invention

The present invention relates to a vehicle attitude control device.

2. Discussion of the Related Art

Heretofore, as vehicle attitude control devices of this kind, there has been known a vehicle turning control device which is provided with wheel speed sensors, a steering wheel angle sensor, a yaw rate sensor and the like (refer to Patent Document 1). In this vehicle turning control device, an arithmetic circuit 58 in an ECU 28 calculates a target yaw rate γt to control a yawing moment based on each of detection values which are detected by those various sensors 50. A control circuit 64 controls a controlled object 70 (automatic brake system) so that the detected actual yaw rate γ coincides with the target yaw rate γt. In the arithmetic circuit 58, an operation section 58b calculates a stability factor. More specifically, in the operation section 58b, a stability factor "A" is obtained from the following expression 1.

$$A=((V-\delta)/(\gamma-L)-1)/V^2 \qquad \text{(Expression 1)}$$

As apparent from the above expression 1, a calculated stability factor A in this case is obtained based on a vehicle body speed V, a steering angle δ of front wheels and an actual yaw rate γ. Accordingly, the stability factor calculated here is not a stability factor provided in advance as a unique or peculiar value for the vehicle 1, but is an estimated stability factor as a result of the calculation on the basis of an actual stable turning motion of the vehicle 1, that is, is a calculated stability factor.

And, in the arithmetic circuit 58, a stability factor in a steady gain 58a is learned from the calculated stability factor. The target yaw rate γt is calculated by making this learned stability factor reflect on the steady gain 58a. Therefore, even when the stability factor of the vehicle 1 varies, a suitable target yaw rate is calculated all the time of such variation.

Therefore, in this vehicle turning control device, a stability factor is estimated based on an actual turning situation of the vehicle, and thus, it can be realized to calculate a more exact motion state compared with the case where a motion state of the vehicle is calculated by using the stability factor fixed to a predetermined value. That is, it can be realized to calculate a yaw rate deviation which is a difference between the target yaw rate γt and the actual yaw rate γ as the motion state of the vehicle.

[Patent Document 1] Japanese unexamined, published patent application No. 10-258720 (pp. 5 and 6, FIG. 3)

However, in the aforementioned vehicle turning control device, although the estimated stability factor is calculated on the basis of a stable turning motion, it has the possibility of differing from the actual stability factor of the vehicle. In this case, in the relation between the estimated stability factor and a stability factor exerted really on a vehicle (hereafter as an actual stability factor), there exist domains where the control is properly executed and other domains where the control is hard to be properly executed or is not executed.

More specifically, since the estimated stability factor almost coincides with the actual stability factor in the domains A1, A2 and A3 as shown in FIG. 14, the control (i.e., oversteer or understeer) is properly executed. On the other hand, in the domains A4, A5 and A6, since the actual stability factor is small, the vehicle is in an oversteer tendency (state). Accordingly, the actual yaw rate tends to increase. In addition, since the estimated stability factor is large than the actual stability factor, the target yaw rate tends to decrease excessively. This results in increasing the absolute value of the yaw rate deviation. That is, the absolute value of the yaw rate deviation is larger than the absolute value of the yaw rate which the vehicle has inherently, so that it is apt to exceed a fixed control intervention threshold value (control intervention threshold value to execute the OS control). Accordingly, it is likely that the oversteer control is executed by mistake notwithstanding that the vehicle is in a state that the oversteer control (the OS control) should not be executed. In another domain A6, such a tendency appears more remarkably since the estimated stability factor is further larger than the actual stability factor compared with those in the domains A4 and A5.

Furthermore, in the domains A7, A8 and A9, since the actual stability factor is large, the vehicle is in the understeer tendency (state). Accordingly, the actual yaw rate tends to decrease. In addition, since the estimated stability factor is smaller than the actual stability factor, the target yaw rate increases excessively. This results in increasing the absolute value of the yaw rate deviation. That is, the absolute value of the yaw rate deviation is larger than the absolute value of the yaw rate which the vehicle has inherently, so that it is apt to exceed a fixed control intervention threshold value (control intervention threshold value to execute the US control). Accordingly, it is likely that the understeer control is executed by mistake notwithstanding that the vehicle is in a state that the understeer control (the US control) should not be executed. In another domain A9, such a tendency appears more remarkably since the estimated stability factor is further smaller than the actual stability factor compared with those in the domains A7 and A8. In any case, in the domains A4 to A9, it is likely that the attitude control is executed excessively (more than as needed).

In addition, the reason why the target yaw rate decreases as mentioned above is that the target yaw rate decreases as the stability factor increases, because the target yaw rate Tω is calculated based on the following expression 2. Conversely, the reason why the target yaw rate increases is that the target yaw rate increases as the stability factor decreases. Symbol V denotes a vehicle body speed, symbol ξ denotes a steering angle of the vehicle, and symbol L denotes a wheelbase of the vehicle.

$$T\omega=(V\times\xi)/(L\times(A\times V^2+1)) \qquad \text{(Expression 2)}$$

SUMMARY OF THE INVENTION

Accordingly, it is a primary object of the present invention to provide an improved vehicle attitude control device which is capable of preventing the unnecessary execution of an attitude control for a vehicle reliably by lowering the sensitivity in judging whether the attitude control is to be executed, in dependence on the result of a comparison between an estimated stability factor and a reference stability factor, so that the attitude control can be executed appropriately despite of the variation in the stability factor.

Briefly, in a first aspect of the present invention, there is provided a vehicle attitude control device for executing an attitude control for a vehicle based on a stability factor which represents a steering property of a vehicle. The vehicle attitude control device comprises estimated stability factor derivation means for deriving a stability factor during turning of the vehicle based on the behavior of the vehicle to take the derivation result as an estimated stability factor; comparison means for comparing the estimated stability factor derived by the estimated stability factor derivation means with a reference stability factor set in advance; and attitude control means for executing the attitude control for the vehicle by varying an attitude control necessary-or-not judgment sensitivity in dependence on a comparison result obtained by the comparison means.

With the construction in the first aspect of the present invention, the estimated stability factor derivation means derives a stability factor during turning of the vehicle based on the behavior of the vehicle to take the derivation result as an estimated stability factor, the comparison means compares the estimated stability factor derived by the estimated stability factor derivation means with the reference stability factor set in advance, and the attitude control means executes the attitude control for the vehicle by varying the attitude control necessary-or-not judgment sensitivity in dependence on the comparison result obtained by the comparison means. Thus, even in the domain where the control is hard to be executed properly or is not executed as is the case of the prior art, that is, even when the estimated stability factor is different from the actual stability factor, the sensitivity of the judgment is lowered in dependence on the result of a comparison of the estimated stability factor A_EST with the reference stability factor A_REF in judging whether the attitude control for the vehicle is necessary or not, whereby it can be realized to prevent the unnecessary execution of the attitude control reliably. Accordingly, it can be realized to execute the attitude control properly irrespective of the fluctuation of the stability factor.

In another or second aspect of the present invention, there is provided a vehicle attitude control device, which comprises vehicle body speed detection means for detecting a speed of a vehicle body; steering angle detection means for detecting a steering angle of the vehicle; actual yaw rate detection means for detecting a yaw rate actually exerted on the vehicle; target yaw rate calculation means for calculating a target yaw rate of the vehicle based on a stability factor representing the steering property of the vehicle; and yaw rate deviation calculation means for calculating a yaw rate deviation by executing a subtraction between the actual yaw rate detected by the actual yaw rate detection means and the target yaw rate calculated by the target yaw rate calculation means. The vehicle attitude control device executes a comparison between the yaw rate deviation calculated by the yaw rate deviation calculation means and a control intervention threshold value to execute an attitude control for the vehicle based on the comparison result. The vehicle attitude control device further comprises estimated stability factor derivation means for deriving a stability factor during turning of the vehicle based on a behavior of the vehicle to take the derivation result as an estimated stability factor; comparison means for comparing the estimated stability factor derived by the estimated stability factor derivation means with a reference stability factor; and attitude control means for executing the attitude control for the vehicle after varying an attitude control necessary-or-not judgment sensitivity based on the comparison result obtained by the comparison means.

With the construction in the second aspect of the present invention, the estimated stability factor derivation means derives a stability factor during turning of the vehicle based on the behavior of the vehicle to take the derivation result as an estimated stability factor, the comparison means compares the estimated stability factor derived by the estimated stability factor derivation means with the reference stability factor, and the attitude control means executes the attitude control for the vehicle after varying the attitude control necessary-or-not judgment sensitivity in dependence on the comparison result obtained by the comparison means. Thus, even in the domain where the control is hard to be executed properly or is not executed as is the case of the prior art, that is, even when the estimated stability factor is different from the actual stability factor, the sensitivity of the judgment is lowered in dependence on the result of a comparison of the estimated stability factor A_EST with the reference stability factor A_REF in judging whether the attitude control for the vehicle is necessary or not, whereby it can be realized to prevent the unnecessary execution of the attitude control reliably. Accordingly, it can be realized to execute the attitude control properly irrespective of the fluctuation of the stability factor.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 1:
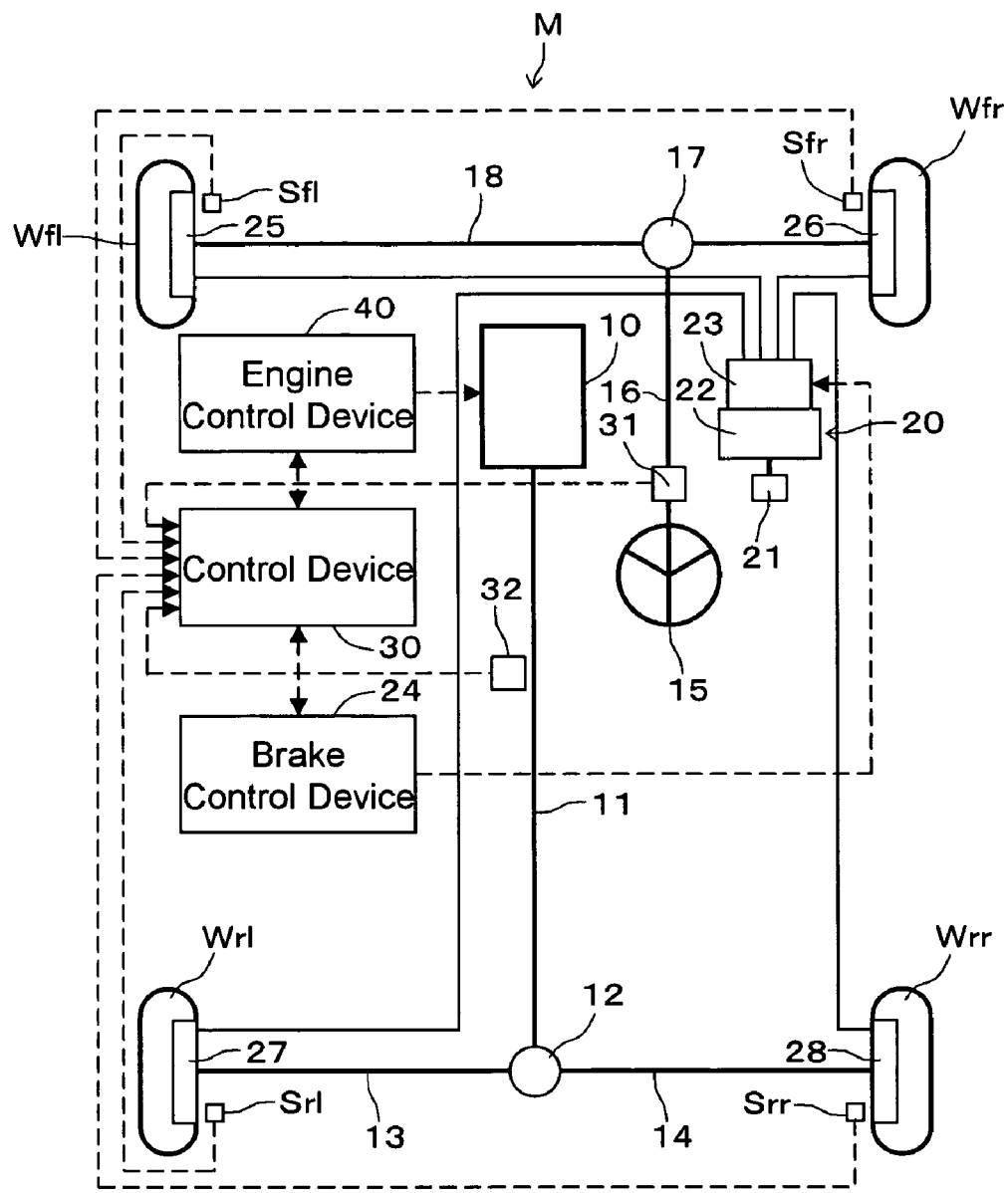
FIG. 1 is a schematic view of a vehicle attitude control device used in first and second embodiments according to the present invention.
Figure 12:
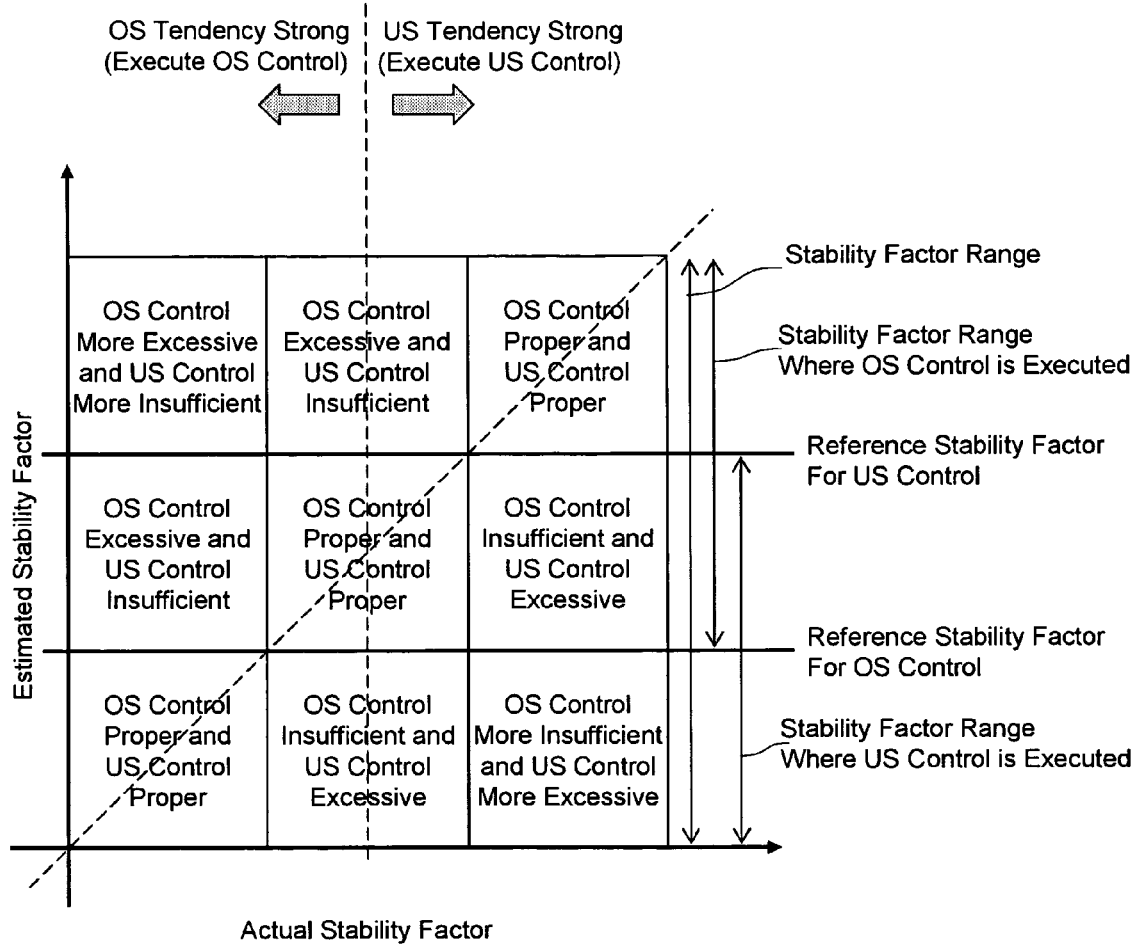
Figure 13:
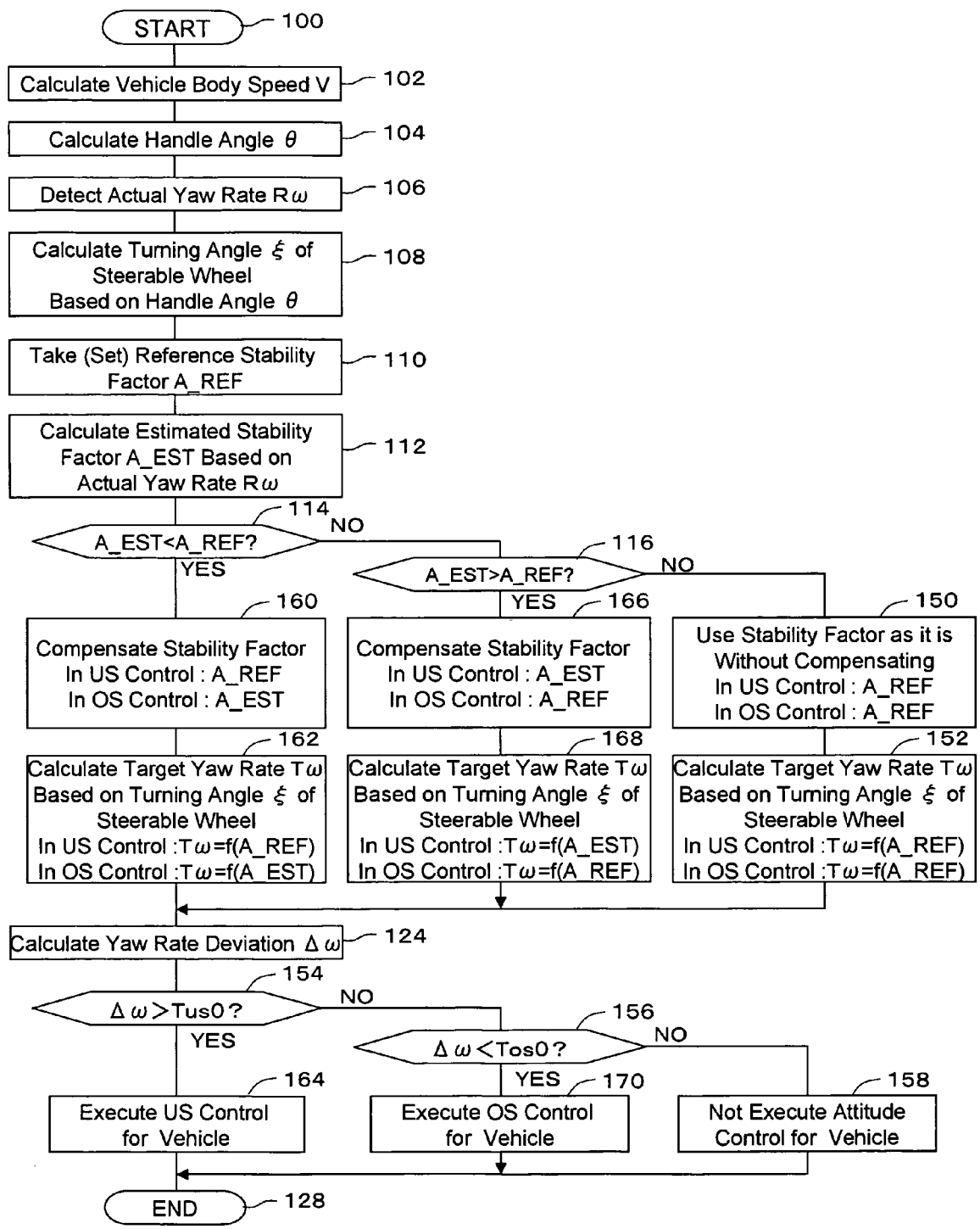
Figure 14:
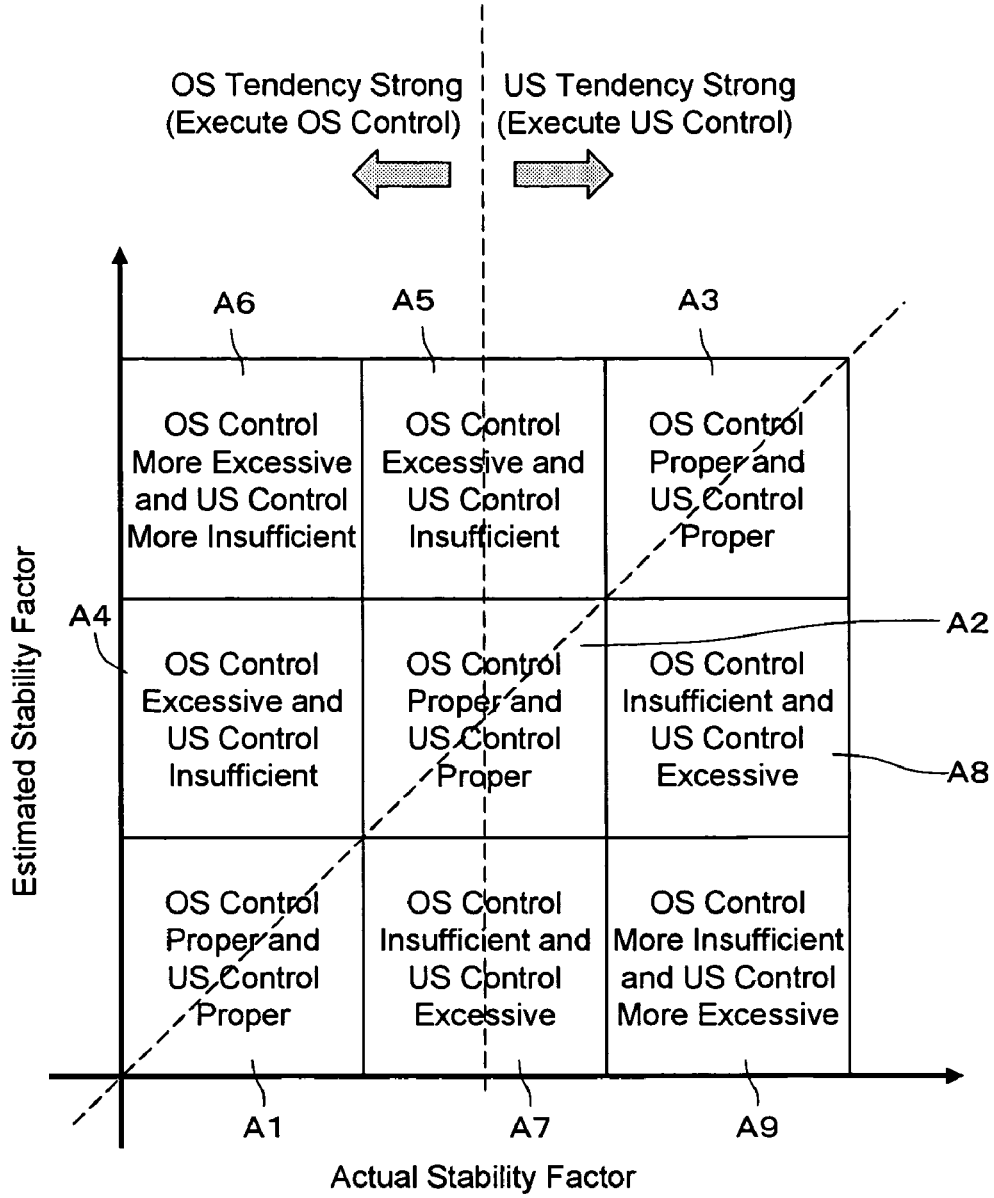

FIG. 12 is a graph showing an excessive state and an insufficient state of the US control and the OS control in the relation between an actual stability factor and an estimated stability factor and also showing the relation between the estimated stability factor and a reference stability factor which has overlapping stability factor ranges where the US control and the OS control are executed respectively;

FIG. 13 is a flowchart showing a program executed by the control device shown in FIG. 1 in the second embodiment; and FIG. 14 is a graph showing an excessive state and an insufficient state of a US control and an OS control in the relation between an actual stability factor and an estimated stability factor in the prior art.

DETAILED DESCRIPTION OF THE PREFERRED EMBODIMENTS

First Embodiment

A vehicle attitude control device in the first embodiment according to the present invention will be described hereinafter with reference to FIG. 1. The vehicle attitude control device is applied to a vehicle M of the rear drive type provided with a vehicle brake device 20 which is capable of applying brake forces independently to left and right front wheels Wfl, Wfr and left and right rear wheels Wrl, Wrr of the vehicle.

The vehicle M is provided with an engine 10 which is incorporated longitudinally at the front of a vehicle body. The engine 10 is connected to the left and right rear wheels Wrl, Wrr through a propeller shaft 11, a differential gear 12, and left and right rear axle shafts 13 and 14, whereby the left and right rear wheels Wrl, Wrr are driven by the output torque of the engine 10. Moreover, the vehicle M is provided with a steering wheel (handle) 15 manipulated by the driver. The handle 15 is connected to a steering shaft 16 integrally. The steering shaft 16 is connected to a tie rod 18 through a steering mechanism 17. The left and right front wheels Wfl, Wfr as steerable wheels are connected to the tie rod 18. Thus, the left and right front wheels Wfl, Wfr are steered by manipulating the handle 15.

A vehicle brake device 20 is provided with a master cylinder 22 which feeds brake oil of an oil pressure in dependence on the stepping manipulation of a brake pedal 21, a brake pressure regulation unit 23 which is provided with two or more electromagnetic valves (not shown) to adjust the oil pressure supplied to each of wheel cylinders 25, 26, 27 and 28 of the left and right front wheels Wfl, Wfr and the left and right rear wheels Wrl, Wrr, and a brake control device 24 which controls the oil pressure supplied to each of wheel cylinders 25, 26, 27 and 28, that is, brake forces applied to the wheels Wfl, Wfr, Wrl and Wrr by controllably changing over the states of those electromagnetic valves of the brake pressure regulation unit 23 in dependence on commands received from a control device 30 mentioned later.

The vehicle M is provided with the control device 30. The control device 30 is connected to a handle angle sensor 31 which is provided on the steering shaft 16 to detect a handle angle θ (the steering wheel angle) of the handle 15 of the vehicle M, wheel speed sensors Sfl, Sfr, Srl and Srr which are respectively provided by the left and right front wheels Wfl, Wfr and the left and right rear wheels Wrl, Wrr to detect wheel speeds of these wheels Wfl, Wfr, Wrl and Wrr, and a yaw rate sensor 32 which is fixed by the barycenter portion of the vehicle body to detect a yaw rate (an actual yaw rate Rω) actually exerted on the vehicle M.

The handle angle sensor 31 outputs two-phase pulse train signals whose signal levels change each time the steering shaft 16 rotates through a predetermined angle, whose phases differ only ¼ cycles mutually and whose progressing sides are reversed mutually in dependence on the rotation direction of the steering shaft 16. The wheel speed sensors Sfl, Sfr, Srl and Srr for detecting the wheel speeds of the left and right front wheels Wfl, Wfr and the left and right rear wheels Wrl, Wrr pick up the rotations of the left and right front wheels Wfl, Wfr and the left and right rear wheels Wrl, Wrr respectively thereby to output pulse train signals of the frequencies each of which is in inverse proportion to each wheel speed. The yaw rate sensor 32 is constituted by an angular velocity sensor, which is provided with an oscillator for detecting an angular velocity around the vertical axis at the gravity center on the vehicle body by using Coriolis force thereby to output a signal showing the direction of a yaw rate acting on the vehicle body and also showing the magnitude proportional to the yaw rate.

Further, the vehicle M is provided with an engine control device 40 which controls the output torque by controlling the opening degree of a throttle (not shown) of the engine 10 in response to a command from the control device 30.

Figure 2:
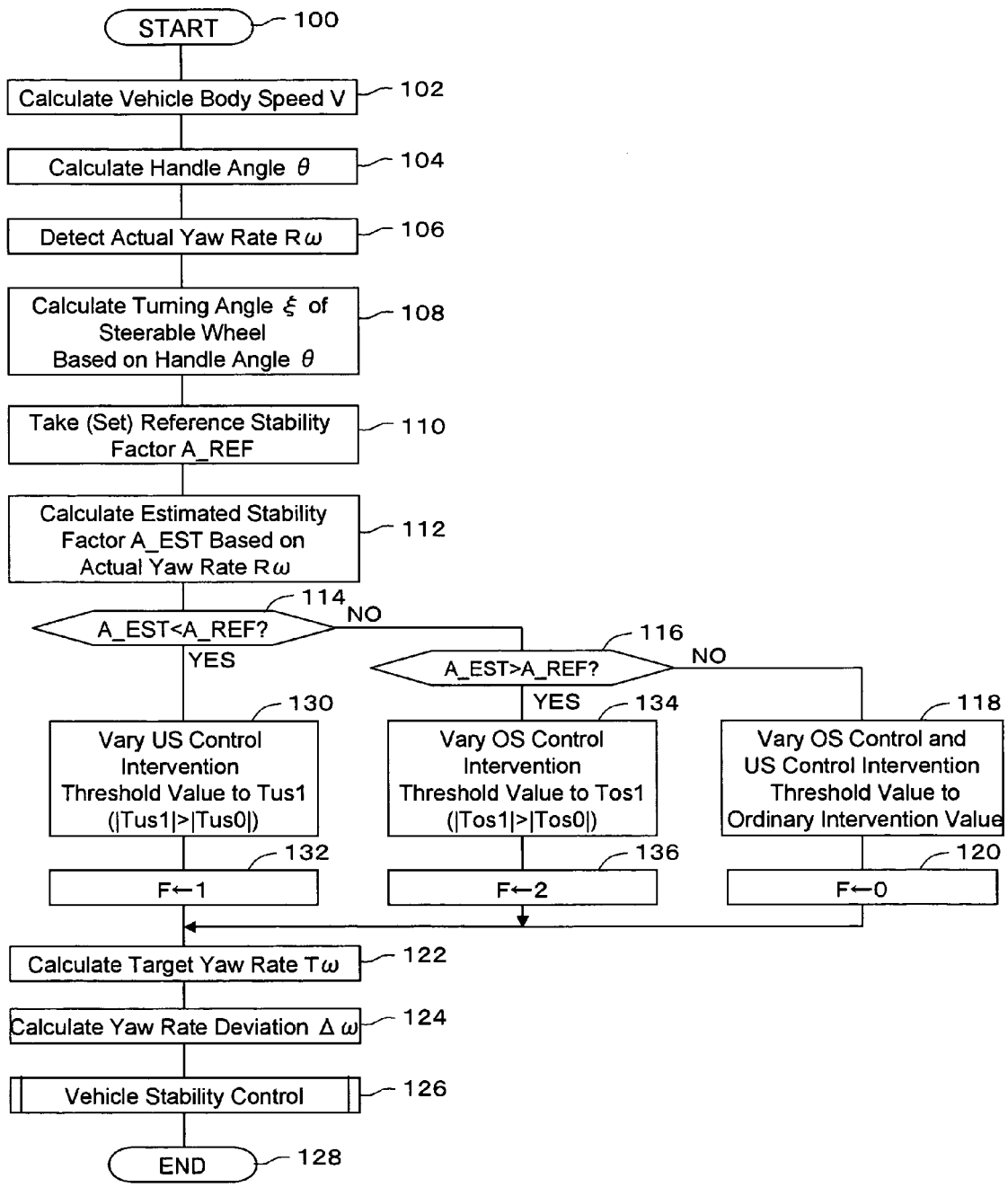
FIG. 2 is a flowchart showing a program executed by a control device shown in FIG. 1 in the first embodiment.

Further, the control device 30 has a microcomputer (not shown), and the microcomputer is provided with an input/output interface, a CPU, a RAM and a ROM (all not shown) respectively connected thereto through a bus. The CPU is provided for executing a program corresponding to a flowchart shown in FIG. 2 to control the attitude of the vehicle M. The ROM is provided for storing the program and a reference stability factor A_REF mentioned later, and the RAM is provided for temporally storing calculation values under control.

Next, the operation of the vehicle attitude control device as constructed above will be described in accordance with the flowchart shown in FIG. 2 to FIG. 6. While an ignition switch (not shown) of the vehicle M is kept in ON-state, the control device 30 repetitively executes a program corresponding to the flowchart at a predetermined short time interval. Each time the execution of the program is started at step 100 in FIG. 2, the control device 30 calculates the vehicle body speed V and the handle angle θ and detects the actual yaw rate Rω (at steps 102 to 106).

The control device 30 first calculates the vehicle body speed V of the vehicle M at step 102 (vehicle body speed detection means). Specifically, values which are in inverse proportion to the frequencies of pulse train signals respectively inputted from the wheel speed sensors Sfl, Sfr, Srl and Srr are calculated as respective wheel speeds of the left and right front wheels Wfl, Wfr and the left and right rear wheels Wrl, Wrr. And, a value which is obtained by averaging these wheel speeds is calculated as the vehicle body speed V. Instead, a value which is obtained by averaging the wheel speeds of the left and right front wheels Wfl, Wfr or the wheel speeds of the left and right rear wheels Wrl, Wrr may be calculated as the vehicle body speed V. Further, where the control device 30 has connected thereto a vehicle speed sensor which is capable of picking up the rotational speed of an output shaft of a transmission (not shown) to output a pulse train signal whose frequency is inversely proportional to the picked-up rotational speed, the control device 30 may be constructed so that as the vehicle bode body speed V, a value which is inversely proportional to the pulse train signal input from the vehicle speed sensor is calculated based on the pulse train signal.

At step 104, the control device 30 calculates the handle angle θ of the vehicle M. That is, the handle angle θ is calculated in accordance with the following expression 3. This can be done by increasing or decreasing the last handle angle θ by a predetermined angle Δθ in dependence on the rotational angle of the steering shaft 16 (determined by the manner of the variation in the two-phase pulse train signals)

each time the variation takes place in the levels of the both of the two-phase pulse train signals inputted from the steering angle sensor 31.

$$\text{Handle Angle } \theta = \text{Last Handle Angle } \theta + \text{Addition/subtraction Value} \times \Delta\theta \quad \text{(Expression 3)}$$

The addition/subtraction value shows the rotational direction of the handle 15 and is determined in dependence on the manner of the variations in the last value and the present time value of two-phase pulse train signals inputted from the handle angle sensor 31. For example, the addition/subtraction value is "0" if the last time value and the present time value are the same to be (0, 0), is "+1" if they are set to be (0, 1), or is "−1" if they are set to be (1, 0).

Immediately after turning on the ignition switch (not shown), the initial value of this handle angle θ is reset to "0", and the subsequent calculation of the handle angle θ is executed based on the reset value. Accordingly, since the handle angle θ only expresses a relative angle from the initial value but does not the absolute angle, the handle angle θ which is an absolute angle from a neutral point is calculated for the first time by calculating the neutral point of the handle angle θ and then by being compensated based on the calculated neutral point.

At step 106, the control device 30 detects the signal expressing the direction and magnitude of a yaw rate from the yaw rate sensor 32 as the actual yaw rate Rω which is actually exerted on the vehicle M (actual yaw rate detection means). Instead, the actual yaw rate Rω may be calculated based on wheel speeds of the left and right front wheels Wfl, Wfr (or the left and right rear wheels Wrl, Wrr).

At step 108, the control device 30 derives a turning angle ξ of the steerable wheels (a vehicle steering angle) from the handle angle θ calculated at the aforementioned step 104 based on the following expression 4 (steering angle derivation means).

$$\text{Turning Angle } \xi \text{ of Steerable Wheels} = C \times \text{Handle Angle } \theta \quad \text{(Expression 4)}$$

Symbol C denotes a proportional constant for the turning angle ξ of the steerable wheels to the handle angle θ. Instead, compensation handle angles for compensating deviations, caused by a play of the handle or the like, of the handle at various angles may be derived in dependence on respective handle angles θ, and the turning angle ξ of the steerable wheels may be calculated by the use of the compensation handle angles. Furthermore, the turning angle ξ of the steerable wheels means the angle which a steering direction of the steerable wheels makes with a vehicle traveling direction.

At step 110, the control device 30 takes the reference stability factor A_REF from a memory section. The reference stability factor A_REF is set in advance and is stored in the control device 30. By the way, it is well known that the steering property of a vehicle varies in dependence on changes in weight and position of a load carried on the vehicle. The variation of the steering property is remarkable in large vehicles such as track, bus and the like for carrying loads and passengers. The stability factor is one of parameters that express the steering property of a vehicle, and thus varies with the change of the weight and the position of the load carried on the vehicle. That is, the stability factor of the vehicle is not a predetermined value peculiar to each vehicle but a value which can be taken within a stability factor range peculiar to each vehicle. The stability factor range is a range which can be taken by the stability factor of the vehicle which is measured actually (or by simulation) with the load carried on the vehicle being changed from a non-loading state to a maximum loading state, or/and with the loading position of the load being changed. The reference stability factor A_REF is a value arbitrarily set within such a stability factor range and is set to a mean value of the stability factor range in the present first embodiment.

Instead, it may be modified that the reference stability factor A_REF can be set automatically by learning at step 110. For example, the method of learning may be using the average value of data which is obtained for a long time with respect to the estimated stability factor A_EST.

The control device 30 at step 112 derives the estimated stability factor A_EST of the vehicle under turning based on the behavior of the vehicle. That is, the control device 30 derives a stability factor by the use of the following expression 5 from the vehicle body speed V, the vehicle steering angle ξ and the actual yaw rate Rω (as detected at step 106) and takes the derivation result as the estimated stability factor A_EST (estimated stability factor derivation means).

$$A\_EST = ((V \times \xi)/(R\omega \times L) - 1)/V^2 \quad \text{(Expression 5)}$$

Symbol L in the above expression 5 denotes the wheelbase of the vehicle M.

Next, in step 114 and those subsequent thereto, the control device 30 compares the estimated stability factor A_EST derived at step 112 with the reference stability factor A_REF read out at step 110 and executes the attitude control for the vehicle by varying an attitude control necessary-or-not judgment sensitivity in dependence on such a comparison result. Description will be made hereinafter in detail regarding a case that the estimated stability factor A_EST is the same as the reference stability factor A_REF, another case that the estimated stability factor A_EST is smaller than the reference stability factor A_REF and another case that the estimated stability factor A_EST is larger than the reference stability factor A_REF.

(Case of A_EST=A_REF)

Figure 7:
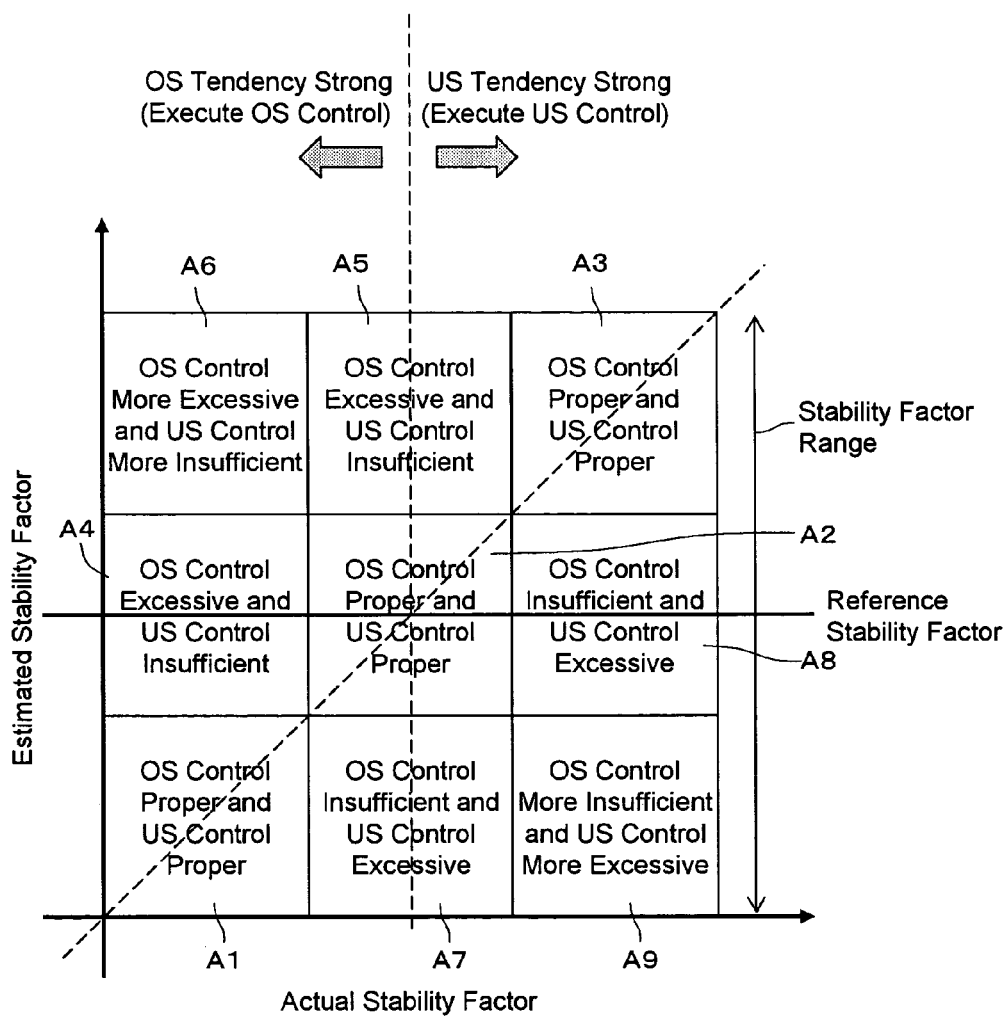
FIG. 7 is a graph showing an excessive state and an insufficient state of a US control and an OS control in the relation between an actual stability factor and an estimated stability factor and also showing the relation between an estimated stability factor and a reference stability factor.

When the estimated stability factor A_EST is the same as the reference stability factor A_REF, the domain A2 shown in FIG. 7 has an estimated stability factor almost coinciding with an actual stability factor, whereby the control (oversteer (OS) control or understeer (US) control) is executed properly. In the domain A4, although the OS control tends to become excessive (sensitive) and the US control tends to become insufficient (insensitive), the degree of the excessive OS control and the insufficient US control is smaller than that in the domain A6. In the domain A8, although the US control tends to become excessive (sensitive) and the OS control tends to become insufficient (insensitive), the degree of the excessive US control and the insufficient OS control is smaller than that in the domain A9. Accordingly, in the domains A2, A4 and A8, it is not necessary to vary the attitude control necessary-or-not judgment sensitivity, or even if necessary, the degree for the variation is a little. The domains A1 to A9 shown in FIG. 7 are the same as the domains A1 to A9 shown in FIG. 14, respectively.

Figure 8:
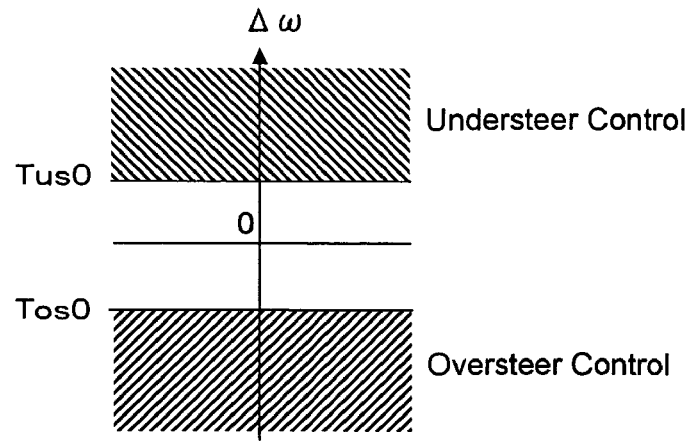
FIG. 8 is a graph showing the relation between a yaw rate deviation and ordinary control intervention threshold values Tus0 and Tos0.

Therefore, the sensitivity for judging whether the US control or the OS control is necessary or not is set to an ordinary sensitivity. Specifically, the control device 30 makes judgments of "NO" at steps 114, 116 and advances the program to step 118. At step 118, as shown in FIG. 8, the control device 30 sets the US control intervention threshold value Tus for starting the US control if the yaw rate deviation Δω (referred to later) becomes more than the US control intervention threshold value Tus, to an ordinary control intervention threshold value Tus0. And, the control device 30 sets the OS control intervention threshold value Tos for starting the OS control if the yaw rate deviation Δω becomes less than the OS control intervention threshold value Tos, to an ordinary control intervention threshold value Tos0. Then, the control device 30 sets a flag F to zero at step 120. The flag F indicates the state of the sensitivity which is utilized for the judgment of whether the attitude control for the vehicle is necessary or not. When the flag F is "0", the sensitivity for both of the OS control and the US control is the ordinary sensitivity. When the flag F is "1", the sensitivity for at least the US control is a low sensitivity. When the flag F is "2", the sensitivity for at least the OS control is a low sensitivity. Further, when comparing the estimated stability factor A_EST with the reference stability factor A_REF at step 114, the control device 30 makes a judgment of "YES" if the estimated stability factor A_EST is smaller than the reference stability factor A_REF, but makes a judgment of "NO" if not. When comparing the estimated stability factor A_EST with the reference stability factor A_REF at step 116, the control device 30 makes a judgment of "YES" if the estimated stability factor A_EST is larger than the reference stability factor A_REF, but makes a judgment of "NO" if not.

The control device 30 calculates the target yaw rate Tω of the vehicle based on the stability factor expressing the steering property of the vehicle at step 122. Specifically, the control device 30 calculates a target yaw rate Tω by the use of the following expression 6 being the same as the above expression 2 from the vehicle body speed V, the vehicle steering angle ξ and the estimated stability factor A_EST (target yaw rate calculation means).

$$T\omega=(V\times\xi)/(L\times(A\_EST\times V^2+1))$$ (Expression 6)

Symbol L in the above expression 2 and expression 6 denotes the wheelbase of the vehicle M.

Then, the control device 30 derives the yaw rate deviation Δω based on the stability factor at step 124. Specifically, the yaw rate deviation Δω (Δω=Tω−Rω) is calculated by subtracting the previously detected actual yaw rate Rω from the target yaw rate Tω calculated at step 122 (yaw rate deviation calculation means). Further, the control device 30 at step 126 compares the previously set ordinary control intervention threshold values Tus0 and Tos0 with the yaw rate deviation Δω calculated at step 124 and executes the attitude control for the vehicle based on the result of such comparison whenever required.

When the estimated stability factor A_EST is the same as the reference stability factor A_REF as described above, the US control intervention threshold value Tus and the OS control intervention threshold value Tos are set to the ordinary control intervention threshold value Tus0 and the ordinary control intervention threshold value Tos0 respectively, and the flag is set to zero. The control device 30 makes a judgment of "YES" at step 202 shown in FIG. 3 since the flag F is zero, and executes the attitude control for the vehicle in which the necessary-or-not judgment is executed with the ordinary sensitivity (step 204). At step 204, the US/OS control intervention ordinary sensitivity routine is executed in accordance with a flowchart shown in FIG. 4.

That is, when the yaw rate deviation Δω is greater than the ordinary control intervention threshold value Tos0 and is less than the ordinary control intervention threshold value Tus0, the vehicle M is in the stable state. Consequently, the control device 30 makes judgments of "NO" at steps 302 and 304 and advances the program to step 306 not to execute the attitude control for the vehicle M. Then, the program is advanced to step 128 through steps 308 and 206 to be terminated temporarily.

Further, when the yaw rate deviation Δω is greater than the ordinary control intervention threshold value Tus0, the vehicle M is in the understeer tendency (state), so that it is not in the stable state. Consequently, the control device 30 makes a judgment of "YES" at step 302 to advance the program to step 310 and then executes the attitude control for the vehicle M, that is, executes the US control. The control device 30 at step 310 sends a command to the brake control device 24 to control brake forces applied to the wheels Wfl, Wfr, Wrl and Wrr, whereby the attitude of the vehicle M is controlled to be brought into the stable state. That is, brake forces are applied to the wheels inside of the vehicle M, thereby to make the same generate a yaw moment toward the inside of the turning movement. Instead, the control device 30 sends a command to the engine control device 40 to control the output torque by controlling the opening degree of the throttle of the engine 10, whereby the attitude of the vehicle M is controlled to be brought into the stable state. That is, the opening degree of the throttle is made to decrease, and the output torque is suppressed. Then, the program is advanced to step 128 through steps 308 and 206 to be terminated temporarily.

Further, when the yaw rate deviation Δω is smaller than the ordinary control intervention threshold value Tos0, the vehicle M is in the oversteer tendency (state), so that it is not in the stable state. Consequently, the control device 30 makes judgments of "NO" and "YES" at steps 302 and 304 respectively to advance the program to step 312 and then executes the attitude control, that is, the OS control for the vehicle M. The control device 30 at step 312 sends a command to the brake control device 24 to control brake forces applied to the wheels Wfl, Wfr, Wrl and Wrr, whereby the attitude of the vehicle M is controlled to be brought into the stable state. That is, brake forces are applied to the wheels outside of the vehicle M, thereby to make the same generate a yaw moment toward the outside of the turning movement. Instead, the control device 30 sends a command to the engine control device 40 to control the output torque by controlling the opening degree of the throttle of the engine 10, whereby the attitude of the vehicle M is controlled to be brought into the stable state. That is, the opening degree of the throttle is made to increase, and the output torque is made to increase. Then, the program is advanced to step 128 through steps 308 and 206 to be terminated temporarily.

(Case of A_EST<A_REF)

When the estimated stability factor A_EST is smaller than the reference stability factor A_REF, the US control tends to become excessive (sensitive) and the OS control tends to become insufficient (insensitive) in the domains A7, A9 and the lower half of the domain A8 shown in FIG. 7. This tendency is remarkable especially in the domain A9. Further, since in these domains the US (understeer) tendency is strong (i.e., in the US state), the US control is executed to cancel such a tendency. On the other hand, the control is properly executed in the domain A1 and the lower half of the domain A2, and the OS control tends to become excessive (sensitive) and the US control tends to become insufficient (insensitive) in the lower half of the domain A4. Further, since in these domains the OS (oversteer) tendency is strong (i.e., in the OS state), the OS control is executed to cancel such a tendency, so that the necessity for the US control is substantially little. Therefore, in the domains A7 to A9, it is necessary to lower the attitude control necessary-or-not judgment sensitivity, especially the US control necessary-or-not judgment sensitivity.

Figure 9:
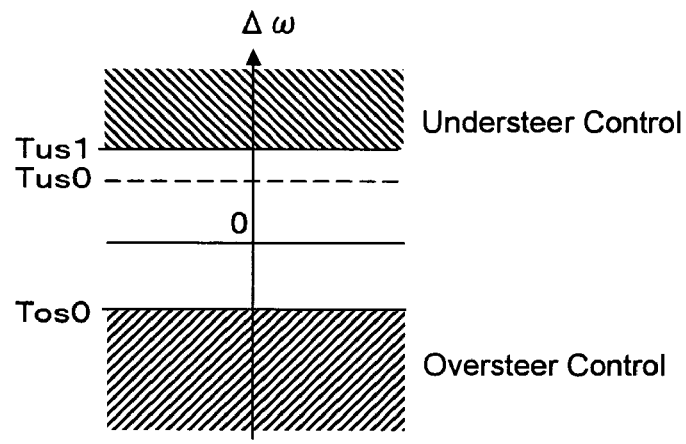
FIG. 9 is a graph showing the relation between a yaw rate deviation and a low sensitivity intervention threshold value Tus1 and the ordinary control intervention threshold value Tos0.

For this reason, the sensitivity for judging whether the US control is necessary or not is set to a low sensitivity. Specifically, the control device 30 makes a judgment of "YES" at step 114 to advance the program to step 130. At step 130, the control device 30 sets the US control intervention threshold value Tus to the low sensitivity control intervention threshold value Tus1 and also sets the OS control intervention threshold value Tos to the ordinary control intervention threshold value Tos0, as shown in FIG. 9. In this case, the low sensitivity control intervention threshold value Tus1 has been set to a larger value than the ordinary control intervention threshold value Tus0 in order to lower the sensitivity for judging whether the US control is necessary or not. That is, a setting is given for |Tus1|>|Tus0|. Then, the control device 30 sets the flag F to "1" at step 132.

Then, as described above, the control device 30 calculates the target yaw rate Tω of the vehicle at step 122, derives the yaw rate deviation Δω at step 124, compares the previously set low sensitivity control intervention threshold value Tus1 and the ordinary control intervention threshold value Tos0 with the yaw rate deviation Δω calculated at step 124, and executes the attitude control for the vehicle based on the result of such comparison at step 126 whenever required.

When the estimated stability factor A_EST is smaller than the reference stability factor A_REF, as described above, the US control intervention threshold value Tus and the OS control intervention threshold value Tos are set respectively to the low sensitivity control intervention threshold value Tus1 and the ordinary control intervention threshold value Tos0, and the flag is set to "1". The control device 30 makes judgments of "NO" and "YES" respectively at steps 202 and 208 shown in FIG. 3 since the flag F is "1", and then executes an attitude control which of those attitude controls, is designed at least for executing the necessary-or-not judgment of the US control with the low sensitivity (step 212). At step 212, the US control intervention low sensitivity routine is executed in accordance with a flowchart shown in FIG. 5.

That is, when the yaw rate deviation Δω is greater than the ordinary control intervention threshold value Tos0 and is less than the low sensitivity control intervention threshold value Tus1, the vehicle M is in the stable state. Consequently, the control device 30 makes judgments of "NO" at steps 402 and 404 and advances the program to step 406 not to execute the attitude control for the vehicle M. Then, the program is advanced to step 128 through steps 408 and 206 to be terminated temporarily.

Further, when the yaw rate deviation Δω is greater than the low sensitivity control intervention threshold value Tus1, the vehicle M is in the understeer tendency (state), so that it is not in the stable state. Thus, the control device 30 makes a judgment of "YES" at step 402 and advances the program to step 410 to execute the attitude control for the vehicle M, that is, the US control, as described above. The control device 30 at step 410 controls brake forces applied to the wheels Wfl, Wfr, Wrl and Wrr or controls the output torque by controlling the opening degree of the throttle of the engine 10 so that the attitude of the vehicle M is brought into the stable state in the same manner as step 310. Then, the program is advanced to step 128 through steps 408 and 206 to be terminated temporarily. Consequently, if the yaw rate deviation Δω becomes greater than the low sensitivity control intervention threshold value Tus1 which is a larger value than the ordinary control intervention threshold value Tus0, the US control is made to start with the result of lowering the sensitivity for the attitude control.

Further, when the yaw rate deviation Δω is smaller than the ordinary control intervention threshold value Tos0, the vehicle M is in the oversteer tendency (state), so that it is not in the stable state. Thus, the control device 30 makes judgments of "NO" and "YES" respectively at steps 402 and 404 to advance the program to step 412 and executes the attitude control for the vehicle M, that is, the OS control, as described above. The control device 30 at step 412 controls brake forces applied to the wheels Wfl, Wfr, Wrl and Wrr or controls the output torque by controlling the opening degree of the throttle of the engine 10, whereby the attitude of the vehicle M is controlled to be brought into the stable state in the same manner as described above at step 312. Then, the program is advanced to step 128 through steps 408 and 206 to be terminated temporarily.

(Case of A_EST>A_REF)

When the estimated stability factor A_EST is greater than the reference stability factor A_REF, in the domains A5, A6 and the upper half of the domain A4 shown in FIG. 7, the OS control tends to become excessive (sensitive) and the US control tends to become insufficient (insensitive). This tendency is remarkable especially in the domain A6. Further, since in these domains the OS (oversteer) tendency is strong (i.e., in the OS state), the OS control is executed to cancel such a tendency. On the other hand, in the domain A3 and the upper half of the domain A2, the control is properly executed, and in the upper half of the domain A8, the US control tends to become excessive (sensitive) and the OS control tends to become insufficient (insensitive). Further, since in these domains the US (understeer) tendency is strong (i.e., in the US state), the US control is executed to cancel such a tendency, so that the necessity to execute the OS control is substantially little. Therefore, in the domains A4 to A6, it is necessary to lower the attitude control necessary-or-not judgment sensitivity, especially the OS control necessary-or-not judgment sensitivity.

Figure 10:
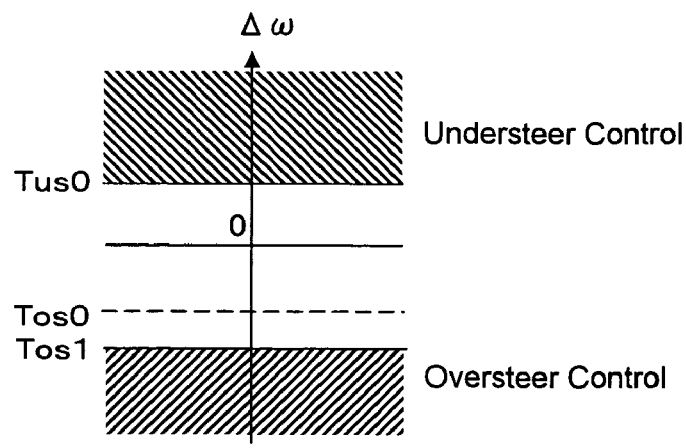
FIG. 10 is a graph showing the relation between a yaw rate deviation and the ordinary control intervention threshold value Tus0 and another low sensitivity intervention threshold value Tos1.

For the aforementioned reason, the sensitivity for judging whether the OS control is necessary or not is set to the low sensitivity. Specifically, the control device 30 makes judgments of "NO" and "YES" respectively at steps 114 and 116 to advance the program to step 134. At step 134, the control device 30 sets the US control intervention threshold value Tus to the ordinary control intervention threshold value Tus0 and also sets the OS control intervention threshold value Tos to the low sensitivity control intervention threshold value Tos1, as shown in FIG. 10. In this case, the low sensitivity control intervention threshold value Tos1 has been set to a smaller value than the ordinary control intervention threshold value Tos0 to lower the sensitivity for judging whether the OS control is necessary or not. That is, a setting is given for |Tos1|>|Tos0|. Then, the control device 30 sets a flag F to "2" at step 136.

Then, as described above, the control device 30 calculates the target yaw rate Tω of the vehicle at step 122, derives the yaw rate deviation Δω at step 124, compares the previously set ordinary control intervention threshold value Tus0 and the low sensitivity control intervention threshold value Tos1 with the yaw rate deviation Δω calculated at step 124, and executes the attitude control for the vehicle based on the result of such comparison at step 126 whenever required.

When the estimated stability factor A_EST is greater than the reference stability factor A_REF, as described above, the US control intervention threshold value Tus and the OS control intervention threshold value Tos are respectively set to the ordinary control intervention threshold value Tus0 and the low sensitivity control intervention threshold value Tos1, and the flag F is set to "2". The control device 30 makes judgments of "NO" at steps 202 and 208 shown in FIG. 3 since the flag F is "2", and then executes an attitude control which of those attitude controls, is designed at least for executing the necessary-or-not judgment of the OS control with the low sensitivity (step 210). At step 210, the OS control intervention low sensitivity routine is executed in accordance with a flowchart shown in FIG. 6.

That is, when the yaw rate deviation Δω is greater than the low sensitivity control intervention threshold value Tos1 and is less than the ordinary control intervention threshold value Tus0, the vehicle M is in the stable state. Thus, the control device 30 makes judgments of "NO" at steps 502 and 504 and advances the program to step 506 not to execute the attitude control for the vehicle M. Then, the program is advanced to step 128 through steps 508 and 206 to be terminated temporarily.

Further, when the yaw rate deviation Δω is greater than the ordinary control intervention threshold value Tus0, the vehicle M is in the understeer tendency (state), so that it is not in the stable state. Thus, the control device 30 makes a judgment of "YES" at step 502 to advance the program to step 510 and executes the attitude control for the vehicle M, that is, the US control, as described above. The control device 30 at step 510 controls brake forces applied to the wheels Wfl, Wfr, Wrl and Wrr or controls the output torque by controlling the opening degree of the throttle of the engine 10, whereby the control device 30 controls the attitude of the vehicle M to be brought into the stable state in the same manner as step 310. Then, the program is advanced to step 128 through steps 508 and 206 to be terminated temporarily.

Further, when the yaw rate deviation Δω is smaller than the low sensitivity control intervention threshold value Tos1, the vehicle M is in the oversteer tendency (state), so that it is not in the stable state. Thus, the control device 30 makes judgments of "NO" and "YES" respectively at steps 502 and 504 and advances the program to step 512 to execute the attitude control for the vehicle M, that is, the OS control, as described above. The control device 30 at step 512 controls brake forces applied to the wheels Wfl, Wfr, Wrl and Wrr or controls the output torque by controlling the opening degree of the throttle of the engine 10, whereby the control device 30 controls the attitude of the vehicle M to be brought into the stable state in the same manner as step 312. Then, the program is advanced to step 128 through steps 508 and 206 to be terminated temporarily. Consequently, if the yaw rate deviation Δω becomes to be less than the low sensitivity control intervention threshold value Tos1 which is a smaller value than the ordinary control intervention threshold value Tos0, the OS control is started to lower the sensitivity for the attitude control.

As clearly understood from the aforementioned explanation, in the present embodiment, the control device 30 derives a stability factor during turning of the vehicle based on the behavior of the vehicle to take the derivation result as the estimated stability factor A_EST (step 112), compares the estimated stability factor A_EST with the reference stability factor A_REF (steps 114 and 116), and executes the attitude control for the vehicle after varying the attitude control necessary-or-not judgment sensitivity based on such a comparison result (steps 122 to 136). Thus, even in the domain where the control is hard to be executed properly or is not executed as is the case of the prior art, that is, even when the estimated stability factor is different from the actual stability factor, the sensitivity of the judgment is lowered in dependence on the result of a comparison of the estimated stability factor A_EST with the reference stability factor A_REF in judging whether the attitude control for the vehicle is necessary or not, whereby it can be realized to prevent the unnecessary execution of the attitude control reliably. Accordingly, it can be realized to execute the attitude control properly irrespective of the fluctuation of the stability factor.

Further, when the estimated stability factor A_EST is smaller than the reference stability factor A_REF, the control device 30 executes the attitude control for the vehicle after varying the attitude control necessary-or-not judgment sensitivity for the understeer control (US control). Accordingly, it can be realized to execute the understeer control properly even when the understeer tendency of the vehicle is strong.

Further, when the estimated stability factor A_EST is greater than the reference stability factor A_REF, the control device 30 executes the attitude control for the vehicle after varying the attitude control necessary-or-not judgment sensitivity of the oversteer control (OS control). Accordingly, it can be realized to execute the oversteer control properly even when the oversteer tendency of the vehicle is strong.

Further, the control device 30 compares the yaw rate deviation Δω derived based on the stability factor with the US control intervention threshold value Tus and the OS control intervention threshold value Tos which are the control intervention threshold values, and executes the attitude control for the vehicle in dependence on the result of such comparison. The attitude control necessary-or-not judgment sensitivity is varied by varying the control intervention threshold values in dependence on the result of the comparison between the estimated stability factor A_EST and the reference stability factor A_REF. Thus, it can be realized to vary the attitude control necessary-or-not judgment sensitivity reliably and easily.

Further, in the foregoing first embodiment, the estimated stability factor derivation means (step 112) derives a stability factor during turning of the vehicle based on the behavior of the vehicle to take such a derivation result as the estimated stability factor A_EST. Then, the comparison means (steps 114, 116) compares the estimated stability factor A_EST derived by the estimated stability factor derivation means with the reference stability factor A_REF, and the attitude control means (steps 130 to 136, 122 to 126) executes the attitude control for the vehicle after varying the attitude control necessary-or-not judgment sensitivity in dependence on the comparison result (steps 118 to 136). Thus, even in the domain where the control is hard to be executed properly or is not executed as is the case of the prior art, that is, even when the estimated stability factor is different from the actual stability factor, the sensitivity of the judgment is lowered in dependence on the result of a comparison of the estimated stability factor A_EST with the reference stability factor A_REF in judging whether the attitude control for the vehicle is necessary or not, whereby it can be realized to prevent the unnecessary execution of the attitude control reliably. Accordingly, it can be realized to execute the attitude control properly irrespective of the fluctuation of the stability factor.

Further, in the foregoing first embodiment, the attitude control means (the control device 30) controls the attitude of the vehicle by controlling brake forces applied to the wheels or/and by controlling the output torque of the engine, so that it can be realized to execute the attitude control for the vehicle accurately and reliably.

Figure 11:
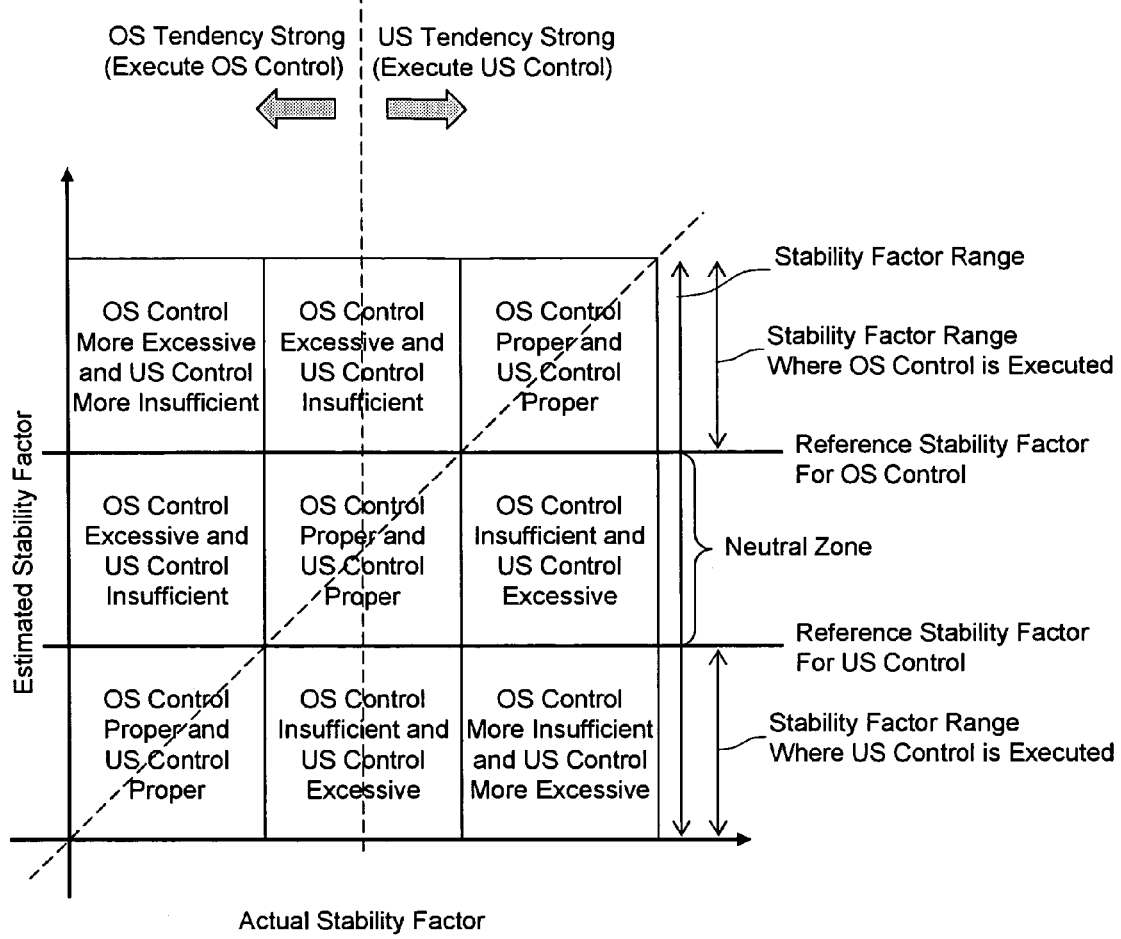
FIG. 11 is a graph showing an excessive state and an insufficient state of the US control and the OS control in the relation between an actual stability factor and an estimated stability factor and also showing the relation between the estimated stability factor and a reference stability factor having a neutral zone.

In the foregoing first embodiment, the reference stability factor A_REF is set as one predetermined value. Instead, respective reference stability factors A_REF may be set for the US control and the OS control in such a form that each of them has a neutral zone. That is, as shown in FIG. 11, the reference stability factor A_REF for the US control and the reference stability factor A_REF for the OS control are set to be offset from each other. Thus, the control device 30 at step 114 compares the reference stability factor A_REF for the US control with the estimated stability factor A_EST and executes the subsequent processings based on the result of such a comparison. Further, the control device 30 at step 116 compares the reference stability factor A_REF for the OS control with the estimated stability factor A_EST and executes the subsequent processings based on the result of such a comparison. The reference stability factor A_REF for the OS control is set to be larger than the reference stability factor A_REF for the US control.

Accordingly, when the estimated stability factor A_EST is between the reference stability factor A_REF for the US control and the reference stability factor A_REF for the OS control, the US control intervention sensitivity and the OS control intervention sensitivity are set to the respective ordinary sensitivities. In other words, the US control intervention threshold value Tus is set to the ordinary control intervention threshold value Tus0, and the OS control intervention threshold value Tos is set to the ordinary control intervention threshold value Tos0 (step 118). Then, the attitude control for the vehicle is executed by using the ordinary sensitivities (step 126). Thus, since a wide range of the stability factor can be secured for the execution of the attitude control using the ordinary sensitivity, it is realized to execute the attitude control with the ordinary sensitivity when the stability factor indicates that the attitude control should be executed with the ordinary sensitivity. Further, when the estimated stability factor A_EST is smaller than the reference stability factor A_REF for the US control (when the estimated stability factor A_EST is within the stability factor range in which the US control is to be executed), the US control intervention sensitivity is set to the low sensitivity (in other words, the US control intervention threshold value Tus is set to the low sensitivity control intervention threshold value Tus1) (step 130). Then, the attitude control for the vehicle is executed by using the low sensitivity (step 126). Thus, it is realized to narrow the detection range for the vehicle state (US state) tending toward the excessive US control, so that measures can be taken effectively against such a state. Further, when the estimated stability factor A_EST is greater than the reference stability factor A_REF for the OS control (when the estimated stability factor A_EST is within the stability factor range in which the OS control is to be executed), the OS control intervention sensitivity is set to the low sensitivity (in other words, the OS control intervention threshold value Tos is set to the low sensitivity control intervention threshold value Tos1) (step 134), and the attitude control for the vehicle is executed by using the low sensitivity (step 126). Thus, it is realized to narrow the detection range for the vehicle state (OS state) tending toward the excessive OS control, so that measures can be taken effectively against such a state. Accordingly, it can be realized to execute the attitude control for the vehicle with the sensitivity depending on the vehicle state.

Further, in the foregoing first embodiment, both of the reference stability factors A_REF for the US control and the OS control may be set to be offset from each other to have a neutral zone, as mentioned above. Conversely, as shown in FIG. 12, the reference stability factors A_REF for the US control and the reference stability factor A_REF for the OS control may be set so that the stability factor ranges for the US control and the OS control are overlapped partly. Thus, the control device 30 at step 114 compares the reference stability factor A_REF for the OS control with the estimated stability factor A_EST and executes the subsequent processings based on the result of such a comparison. Further, the control device 30 at step 116 compares the reference stability factor A_REF for the US control with the estimated stability factor A_EST and executes the subsequent processings based on the result of such a comparison. The reference stability factor A_REF for the OS control is set to be smaller than the reference stability factor A_REF for the US control.

Accordingly, when the estimated stability factor A_EST is smaller than the reference stability factor A_REF for the OS control, the US control intervention sensitivity is set to the low sensitivity (in other words, the US control intervention threshold value Tus is set to the low sensitivity control intervention threshold value Tus1) (step 130), and the attitude control for the vehicle is executed by using the low sensitivity (step 126). Thus, it is realized to reliably detect the vehicle state (US state) tending toward the excessive US control, so that measures can be taken effectively against such a state. Further, when the estimated stability factor A_EST is greater than the reference stability factor A_REF for the US control, the OS control intervention sensitivity is set to the low sensitivity (in other words, the OS control intervention threshold value Tos is set to the low sensitivity control intervention threshold value Tos1) (step 134), and the attitude control for the vehicle is executed by using the low sensitivity (step 126). Thus, it is realized to reliably detect the vehicle state (OS state) tending toward the excessive OS control, so that measures can be taken effectively against such a state. Further, when the estimated stability factor A_EST is between the reference stability factor A_REF for the US control and the reference stability factor A_REF for the OS control, the US control intervention sensitivity and the OS control intervention sensitivity are set to the low sensitivities instead of the processing of step 118 (in other words, the US control intervention threshold value Tus is set to the low sensitivity control intervention threshold value Tus1, and the OS control intervention threshold value Tos is set to the low sensitivity control intervention threshold value Tos1), and the attitude control for the vehicle is executed by using the low sensitivities (step 126). Thus, it is realized to reliably detect the vehicle state tending toward the excessive OS control or/and the excessive US control, so that measures can be taken effectively against such a state. Accordingly, the reference stability factor A_REF for the US control becomes larger compared with that in the aforementioned first embodiment, and the reference stability factor A_REF for the OS control becomes smaller, so that, it is realized to lower the sensitivities for judging whether the US control and the OS control are necessary or not for the vehicle which is strong in both of the understeer tendency and oversteer tendency.

Figure 3:
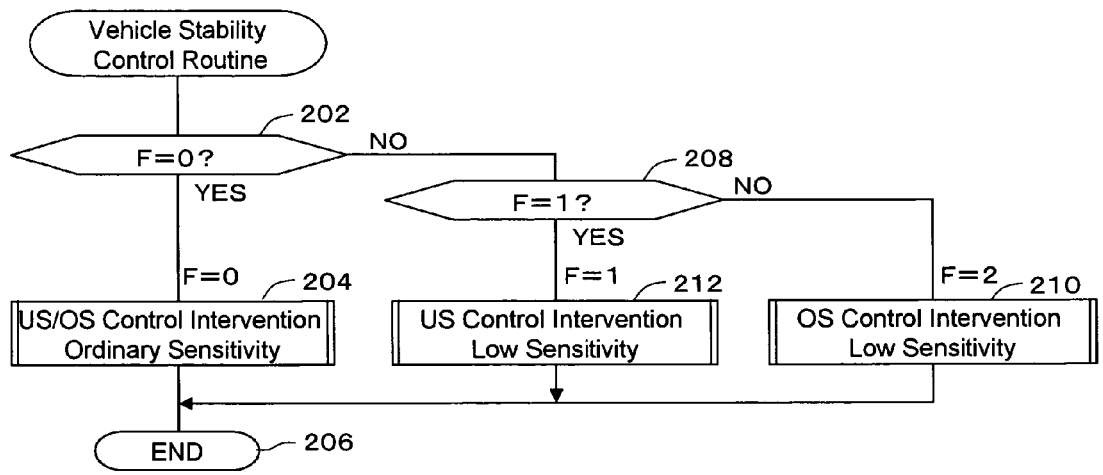
FIG. 3 is a flowchart showing a vehicle stability control routine in the flowchart shown in FIG. 2.
Figure 4:
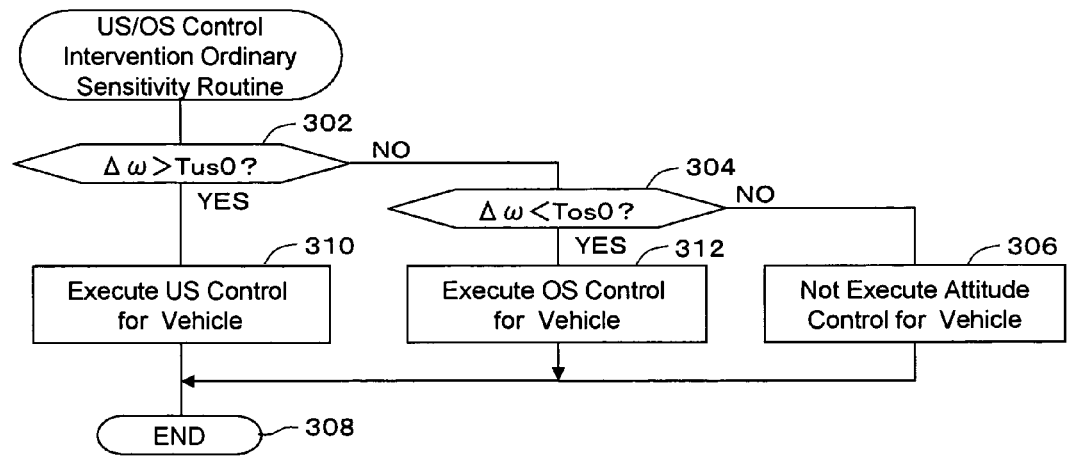
FIG. 4 is a flowchart showing a US/OS control intervention ordinary sensitivity routine in the flowchart shown in FIG. 3.
Figure 5:
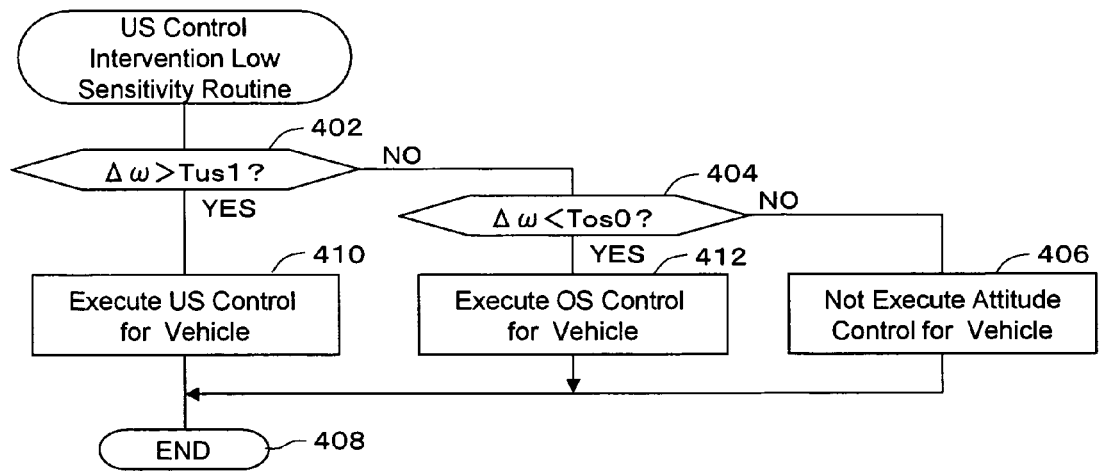
FIG. 5 is a flowchart showing a US control intervention low sensitivity routine in the flowchart shown in FIG. 3.
Figure 6:
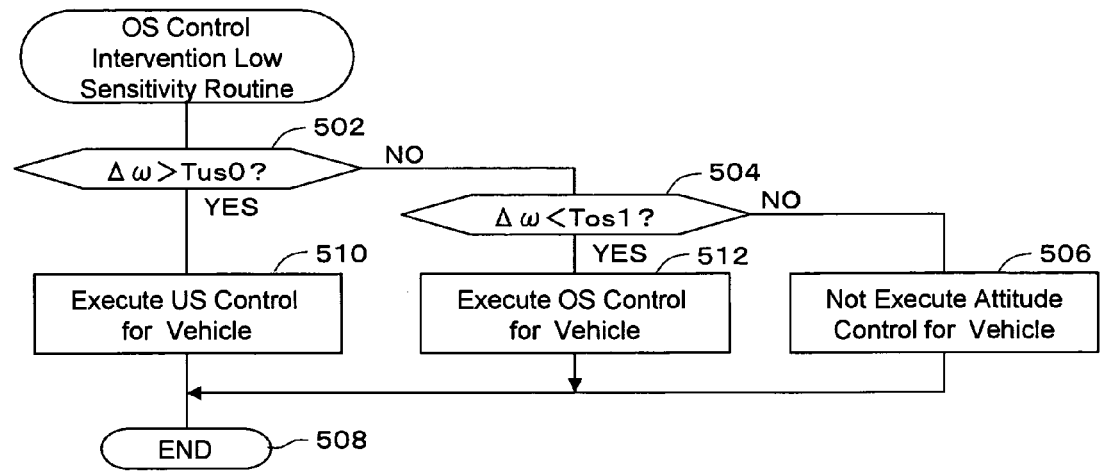
FIG. 6 is a flowchart showing an OS control intervention low sensitivity routine in the flowchart shown in FIG. 3.

Alternatively, in this case, a US/OS control intervention low sensitivity routine for executing the US control and the OS control with the respective low sensitivities may be executed instead of step 204 shown in FIG. 3, and instead of the subroutine shown in FIG. 4, there may be executed another subroutine for executing instead of step 302 the judgment of whether or not the yaw rate deviation Δω is larger than the low sensitivity control intervention threshold value Tus1 and for executing instead of step 304 the processing judging whether or not the yaw rate deviation Δω is smaller than the low sensitivity control intervention threshold value Tos1.

Second Embodiment

Next, a vehicle attitude control device in a second embodiment according to the present invention will be described with reference to drawings. In the foregoing first embodiment, the control device 30 compares the yaw rate deviation Δω derived based on the stability factor with the US control intervention threshold value Tus and the OS control intervention threshold value Tos which are the control intervention threshold values, to execute the attitude control for the vehicle in dependence on the result of such comparison. The attitude control necessary-or-not judgment sensitivity is varied by varying the control intervention threshold value based on the result of the comparison between the estimated stability factor A_EST and the reference stability factor A_REF. On the other hand, in the second embodiment, the control device 30 varies the attitude control necessary-or-not judgment sensitivity by compensating the stability factor based on the result of the comparison between the estimated stability factor A_EST and the reference stability factor A_REF.

That is, the control device 30 executes the program corresponding to the flowchart of FIG. 13 instead of executing the program corresponding to the flowcharts of FIG. 2 to FIG. 6, to control the attitude of the vehicle M. The processings in the second embodiment which are identical to those in the first embodiment are given the same reference numerals as used in the first embodiment and are omitted from being described in detail. Therefore, the following description is addressed to the respects which are different from those in the first embodiment.

(Case of A_EST=A_REF)

When the estimated stability factor A_EST is the same as the reference stability factor A_REF, especially in the case that the reference stability factor A_REF is set to the mean of the stability factor range, the US control and the OS control for the vehicle are hard to become excessive, and therefore, it is little necessary to make the US control necessary-or-not judgment and the OS control necessary-or-not judgment insensible. That is, it is little necessary to provide a compensation such as offsetting the yaw rate deviation Δω from the US control intervention threshold value or the OS control intervention threshold value. Accordingly, the target yaw rates Tω used in executing the US control and the OS control are respectively calculated by the use of the above expression 6 from the vehicle body speed V, the vehicle steering angle ξ and the estimated stability factor A_EST, the yaw rate deviation Δω is calculated to be compared with the ordinary control intervention threshold value Tus0 or with the ordinary control intervention threshold value Tos0, and the attitude control for the vehicle is executed based on such a comparison result whenever required.

Specifically, the control device 30 makes judgments of "NO" respectively at steps 114 and 116 to advance the program to step 150. At step 150, a predetermined stability factor is used without compensating the stability factor in executing the US control and the OS control, and the predetermined stability factor is used in the processing successive thereto. In this case, since the reference stability factor A_REF and the estimated stability factor A_EST are the same, the reference stability factor A_REF is utilized as the estimated stability factor A_EST.

Then, the control device 30 at step 152 calculates the target yaw rate Tω of the vehicle based on the stability factor representing the steering property of the vehicle in the same manner as the processing at step 122. Although at step 122, the estimated stability factor A_EST is utilized as the stability factor, the reference stability factor A_REF is utilized at step 152. Specifically, the target yaw rate Tω is calculated by the use of the following expression 7 from the vehicle body speed V, the vehicle steering angle ξ and the reference stability factor A_REF (target yaw rate calculation means).

$$T\omega=(V\times\xi)/(L\times(A\_REF\times V^2+1))$$ (Expression 7)

Symbol L in the above expression 7 denotes the wheelbase of the vehicle M. Further, the target yaw rates Tω used in executing the US control and the OS control are calculated. Since the reference factor A_REF and the estimated stability factor A_EST are the same in either case, the reference factor A_REF is used as the estimated stability factor A_EST.

The control device 30 derives the yaw rate deviation Δω based on the stability factor at step 124. Specifically, the yaw rate deviation Δω (Δω=Tω−Rω) is calculated by subtracting the previously detected actual yaw rate Rω from the target yaw rate Tω calculated at step 152 (yaw rate deviation calculation means).

Then, the control device 30 compares the previously set ordinary control intervention threshold value Tus0 and the ordinary control intervention threshold value Tos0 with the yaw rate deviation Δω calculated at step 124 and executes the attitude control for the vehicle based on such a comparison result whenever required, through the processing of steps 154 to 158, 164 and 170. Specifically, when the yaw rate deviation Δω is between the ordinary control intervention threshold values Tus0 and Tos0, the control device 30 makes judgments of "NO" respectively at steps 154 and 156 and advances the program to step 158 not to execute the attitude control for the vehicle M at step 158. Then, the program is advanced to step 128 to be terminated temporarily. Further, when the yaw rate deviation Δω is larger than the ordinary control intervention threshold value Tus0, the vehicle M is in the understeer tendency (state), so that it is not in the stable state. Thus, the control device 30 makes a judgment of "YES" at step 154 to advance the program to step 164 and executes the attitude control for the vehicle M, that is, the US control in the same manner as step 310. Then, the program is advanced to step 128 to be terminated temporarily. Further, when the yaw rate deviation Δω is smaller than the ordinary control intervention threshold value Tos0, the vehicle M is in the oversteer tendency (state), so that it is not in the stable state. Thus, the control device 30 makes judgments of "NO" and "YES" at steps 154 and 156 to advance the program to step 170 and executes the attitude control for the vehicle M, that is, the OS control in the same manner as step 312. Then, the program is advanced to step 128 to be terminated temporarily.

(Case of A_EST<A_REF)

When the estimated stability factor A_EST is smaller than the reference stability factor A_REF especially in the case that the reference stability factor A_REF is set to the mean of the stability factor range, the US control for the vehicle tends to become excessive, and therefore it is necessary to make the US control necessary-or-not judgment insensible (lowered). That is, the reason why the US control tends to become excessive is because the target yaw rate Tω is a large value relative to the actual yaw rate Rω. For solving this, it is necessary to make a compensation so that the target yaw rate Tω becomes small (i.e., the vehicle is brought into the understeer tendency). To that end, it is necessary to compensate the estimated stability factor A_EST to a larger value as is clear from the aforementioned expression 6. Therefore, the reference stability factor A_REF which is a larger value than the estimated stability factor A_EST is used in executing the US control. The estimated stability factor A_EST used here is not limited to the reference stability factor A_REF. Instead, there may be used a larger value than the estimated stability factor A_EST (e.g., a value obtained by adding to a predetermined value to the estimated stability factor A_EST). Accordingly, in executing the US control, a target yaw rate Tω for the US control is calculated by the use of the above expression 7 from the vehicle body speed V, the vehicle steering angle ξ and the reference stability factor A_REF. In executing the OS control, a target yaw rate Tω for the OS control is calculated by the use of the above expression 6 from the vehicle body speed V, the vehicle steering angle ξ and the reference stability factor A_EST. Then, a yaw rate deviation Δω is calculated to be compared with the ordinary control intervention threshold value Tus0, and the attitude control for the vehicle is executed based on such a comparison result whenever required.

Specifically, the control device 30 makes a judgment of "YES" at step 114 to advance the program to step 160. At step 160, the stability factor is compensated to the reference stability factor A_REF for use in executing the US control, and the estimated stability factor A_EST is used without compensating the stability factor for use in executing the OS control. Then, these stability factors are used in the subsequence processing.

Then, the control device 30 at step 162 calculates the target yaw rate Tω of the vehicle based on the stability factor representing the steering property of the vehicle in the same manner as the processing at step 122. Although at the aforementioned step 122, the estimated stability factor A_EST is used as the stability factor, this step 162 uses the reference stability factor A_REF in executing the US control and uses the estimated stability factor A_EST in executing the OS control. Specifically, in executing the US control, the target yaw rate Tω is calculated by the use of the above expression 7 from the vehicle body speed V, the vehicle steering angle ξ and the reference stability factor A_REF, while in executing the OS control, the target yaw rate Tω is calculated by the use of the above expression 6 from the vehicle body speed V, the vehicle steering angle ξ and the reference stability factor A_EST.

Further, the control device 30 executes the processing successive to the aforementioned step 124 to calculate the yaw rate deviation Δω (Δω=Tω−Rω) by subtracting the previously detected actual yaw rate Rω from the target yaw rate Tω calculated at step 162, then to compare the yaw rate deviation Δω with the previously set ordinary control intervention threshold values Tus0 and Tos0 and to execute the attitude control for the vehicle based on the comparison result whenever required.

(Case of A_EST>A_REF)

When the estimated stability factor A_EST is greater than the reference stability factor A_REF especially in the case that the reference stability factor A_REF is set to the mean of the stability factor range, the OS control for the vehicle tends to become excessive, and therefore it is necessary to make the OS control necessary-or-not judgment insensible (lowered). That is, the reason why the OS control tends to become excessive is because the target yaw rate Tω is a small value relative to the actual yaw rate Rω. For solving this, it is necessary to make a compensation so that the target yaw rate Tω becomes large (i.e., the vehicle is brought into the oversteer tendency). To that end, it is necessary to compensate the estimated stability factor A_EST to a smaller value as is clear from the aforementioned expression 6. Therefore, the reference stability factor A_REF which is a smaller value than the estimated stability factor A_EST is used in executing the OS control. The estimated stability factor A_EST used here is not limited to the reference stability factor A_REF. Instead, there may be used a smaller value than the estimated stability factor A_EST (e.g., a value obtained by subtracting a predetermined value from the estimated stability factor A_EST). Accordingly, in executing the OS control, a target yaw rate Tω for the OS control is calculated by the use of the above expression 7 from the vehicle body speed V, the vehicle steering angle ξ and the reference stability factor A_REF. In executing the US control, a target yaw rate Tω for the US control is calculated by the use of the above expression 6 from the vehicle body speed V, the vehicle steering angle ξ and the reference stability factor A_EST. Then, a yaw rate deviation Δω is calculated to be compared with the ordinary control intervention threshold value Tus0, and the attitude control for the vehicle is executed based on such a comparison result whenever required.

Specifically, the control device 30 makes judgments of "NO" and "YES" respectively at steps 114 and 116 to advance the program to step 166. At step 166, the stability factor is compensated to the reference stability factor A_REF for use in executing the OS control, and the estimated stability factor A_EST is used without compensating the stability factor for use in executing the US control. Then these stability factors are used in the subsequence processing.

Then, the control device 30 at step 168 calculates the target yaw rate Tω of the vehicle based on the stability factor representing the steering property of the vehicle in the same manner as the processing at step 122. Although at the aforementioned step 122, the estimated stability factor A_EST is used as the stability factor, this step 168 uses the reference stability factor A_REF in executing the OS control and uses the estimated stability factor A_EST in executing the US control. Specifically, in executing the OS control, the target yaw rate Tω is calculated by the use of the above expression 7 from the vehicle body speed V, the vehicle steering angle ξ and the reference stability factor A_REF, while in executing the US control, the target yaw rate Tω is calculated by the use of the above expression 6 from the vehicle body speed V, the vehicle steering angle ξ and the reference stability factor A_EST.

Further, the control device 30 executes the processing successive to the aforementioned step 124 to calculate the yaw rate deviation Δω (Δω=Tω−Rω) by subtracting the previously detected actual yaw rate Rω from the target yaw rate Tω calculated at step 168, then to compare the yaw rate deviation Δω with the previously set ordinary control intervention threshold values Tus0 and Tos0 and to execute the attitude control for the vehicle based on such a comparison result whenever required.

As clearly understood from the aforementioned explanation also, in the present embodiment, the control device 30 derives a stability factor during turning of the vehicle based on the behavior of the vehicle to take the derivation result as the estimated stability factor A_EST (step 112), compares the estimated stability factor A_EST with the reference stability factor A_REF (steps 114 and 116), and executes the attitude control for the vehicle after varying the attitude control necessary-or-not judgment sensitivity in dependence on such a comparison result (steps 150, 152, 158, 160 to 170). Thus, even in the domain where the control is hard to be executed properly or is not executed as is the case of the prior art, that is, even when the estimated stability factor is different from the actual stability factor, the sensitivity of the judgment is lowered in dependence on the result of a comparison of the estimated stability factor A_EST with the reference stability factor A_REF in judging whether the attitude control for the vehicle is necessary or not, whereby it can be realized to prevent the unnecessary execution of the attitude control reliably. Accordingly, it can be realized to execute the attitude control properly irrespective of the fluctuation of the stability factor.

Further, the control device 30 varies the attitude control necessary-or-not judgment sensitivity by compensating the stability factor based on the result of the comparison between the estimated stability factor A_EST and the reference stability factor A_REF (steps 160, 166). Thus, it is realized to vary the attitude control necessary-or-not judgment sensitivity reliably and easily. Moreover, the control device 30 can vary the attitude control necessary-or-not judgment sensitivity through the easier processing.

Further, in the foregoing second embodiment, like the aforementioned first embodiment, both of the reference stability factors A_REF for the US control and the OS control may be set to be offset from each other to have a neutral zone. Conversely, both of the reference stability factors A_REF for the US control and the OS control may be set so that the stability factor ranges wherein the US control and the OS control are respectively executed are overlapped partly.

Further, in each of the foregoing embodiments, it is preferable that each of the reference stability factors A_REF (including the reference stability factor A_REF for the US control and the OS control) is a value which is set arbitrarily within the peculiar stability factor range of the vehicle. Thus, since the reference stability factor can be varied within the predetermined domain, it can be realized to set the attitude control necessary-or-not judgment sensitivity in dependence on the steering property of the vehicle more properly.

Further, in each of the foregoing embodiments, the control device 30 may be modified to execute the attitude control for the vehicle after lowering the attitude control necessary-or-not judgment sensitivity before starting the derivation of the estimated stability factor A_EST. In this modified case, the aforementioned processing for lowering the attitude control necessary-or-not judgment sensitivity may be executed by the time when the processing of the aforementioned step 112 is executed after the ignition switch of the vehicle is turned on. Thus, the attitude control can be more completely prevented from being executed wrongly.

Various features and many of the attendant advantages in the foregoing embodiment will be summarized as follows:

In the vehicle attitude control device in the foregoing embodiments, when the estimated stability factor A_EST is smaller than the reference stability factor A_REF, the attitude control means executes the attitude control for the vehicle by varying the attitude control necessary-or-not judgment sensitivity for the understeer control (US control). Accordingly, when the understeer tendency of the vehicle is strong, it can be realized to execute the understeer control properly.

Also in the vehicle attitude control device in the foregoing embodiments, when the estimated stability factor A_EST is larger than the reference stability factor A_REF, the attitude control means executes the attitude control for the vehicle by varying the attitude control necessary-or-not judgment sensitivity for the oversteer control (OS control). Accordingly, when the oversteer tendency of the vehicle is strong, it can be realized to execute the oversteer control properly.

Also in the vehicle attitude control device in the foregoing embodiments, the attitude control means compares the yaw rate deviation $\Delta\omega$ derived based on the stability factor with the US control intervention threshold value Tus and the OS control intervention threshold value Tos which are the control intervention threshold values, and executes the attitude control for the vehicle in dependence on the result of such comparison. The attitude control necessary-or-not judgment sensitivity is varied by varying the control intervention threshold value based on the result of the comparison between the estimated stability factor A_EST and the reference stability factor A_REF. Thus, it can be realized to vary the attitude control necessary-or-not judgment sensitivity reliably and easily.

Also in the vehicle attitude control device in the foregoing embodiments, the attitude control means varies the attitude control necessary-or-not judgment sensitivity by compensating the stability factor based on the result of the comparison between the estimated stability factor A_EST and the reference stability factor A_REF. Thus, it can be realized to vary the attitude control necessary-or-not judgment sensitivity reliably and easily.

Also in the vehicle attitude control device in the foregoing embodiments, the reference stability factor A_REF is the value set arbitrarily within the peculiar stability factor range of the vehicle. Thus, since the reference stability factor can be varied within the predetermined domain, it can be realized to set the attitude control necessary-or-not judgment sensitivity in correspondence to the steering property of the vehicle more properly.

Also in the vehicle attitude control device in the foregoing embodiments, the attitude control means executes the attitude control for the vehicle after lowering the attitude control necessary-or-not judgment sensitivity before starting the derivation of the estimated stability factor A_EST by the estimated stability factor derivation means. Thus, the attitude control can be more completely prevented from being executed wrongly.

Also in the vehicle attitude control device in the foregoing embodiments, the attitude control means controls the attitude of the vehicle by controlling the brake forces to wheels or/and by controlling the output torque of the engine. Accordingly, it can be realized to execute the attitude control for the vehicle accurately and reliably.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle attitude control device for controlling the attitude of a vehicle to make a deviation between a measured actual yaw rate representing a steering property depending on the state of a load carried on the vehicle and a target yaw rate calculated in advance come close to zero by using a reference stability factor, the reference stability factor being a value set within a stability factor range particular to the vehicle and including values which are obtained by changing the state of a load quantity carried on the vehicle from a non-loading state to a maximum loading state, the vehicle attitude control device comprising:

vehicle body speed detection means for detecting a vehicle body speed;

steering angle detection means for detecting a steering angle of the vehicle;

actual yaw rate detection means for detecting a yaw rate actually exerted on the vehicle;

target yaw rate calculation means for calculating a target yaw rate of the vehicle based on a stability factor representing the steering property of the vehicle; and yaw rate deviation calculation means for calculating a yaw rate deviation by executing a subtraction between the actual yaw rate detected by the actual yaw rate detection means and the target yaw rate calculated by the target yaw rate calculation means;

wherein a comparison between the yaw rate deviation calculated by the yaw rate deviation calculation means and control intervention threshold values is made to execute an attitude control for the vehicle based on the comparison result, and wherein the vehicle attitude control device further comprises:

estimated stability factor derivation means for deriving the stability factor by calculation during turning of the vehicle based on the behavior of the vehicle represented by parameters including at least the vehicle speed, the steering angle and the actual yaw rate, with a result of the derivation being taken as an estimated stability factor; and attitude control means for comparing the estimated stability factor estimated based on at least the vehicle speed, the steering angle and the actual yaw rate which are measured at a predetermined time interval during turning of the vehicle, and the reference stability factor, for lowering an attitude control necessary-or-not judgment sensitivity based on a result of the comparison, by lowering the control intervention threshold values, and for executing the attitude control for the vehicle after lowering the attitude control necessary-or-not judgment sensitivity.

2. The vehicle attitude control device as set forth in claim 1, wherein after the estimated stability factor derivation means derives the estimated stability factor, the attitude control means lowers the attitude control necessary-or-not judgment sensitivity and then executes the attitude control for the vehicle.

3. The vehicle attitude control device as set forth in claim 1, wherein the attitude control means controls the attitude of the vehicle by controlling brake force applied to wheels or/and by controlling an output torque of an engine.

4. The vehicle attitude control device as set forth in claim 1, wherein the attitude control necessary-or-not judgment sensitivity is represented by an understeer control intervention threshold value which is one of the control intervention threshold values for judging whether an understeer control is necessary or not for the vehicle, and an oversteer control intervention threshold value which is an other of the control intervention threshold values for judging whether an oversteer control is necessary or not for the vehicle.

5. The vehicle attitude control device as set forth in claim 4, wherein when the estimated stability factor is smaller than the reference stability factor, the attitude control means lowers the understeer control intervention threshold value for the understeer control and then executes the attitude control for the vehicle.

6. The vehicle attitude control device as set forth in claim 4, wherein when the estimated stability factor is larger than the reference stability factor, the attitude control means lowers the oversteer control intervention threshold value for the oversteer control and then executes the attitude control for the vehicle.

7. The vehicle attitude control device as set forth in claim 4, wherein the attitude control means compares the yaw rate deviation derived based on the actual yaw rate and the target yaw rate with the understeer and oversteer control intervention threshold values and determines whether to execute the attitude control for the vehicle, in dependence on the result of such comparison.

8. A vehicle attitude control device for
controlling the attitude of a vehicle to make a deviation between a measured actual yaw rate representing a steering property depending on the state of a load carried on the vehicle and a target yaw rate calculated in advance come close to zero by using a reference stability factor, the reference stability factor being a value set within a stability factor range particular to the vehicle and including values which are obtained by changing the state of a load quantity carried on the vehicle from a non-loading state to a maximum loading state, the vehicle attitude control device comprising:

vehicle body speed detection means for detecting a vehicle body speed;
steering angle detection means for detecting a steering angle of the vehicle;
actual yaw rate detection means for detecting a yaw rate actually exerted on the vehicle;
target yaw rate calculation means for calculating a target yaw rate of the vehicle based on a stability factor representing the steering property of the vehicle;
yaw rate deviation calculation means for calculating a yaw rate deviation by executing a subtraction between the actual yaw rate detected by the actual yaw rate detection means and the target yaw rate calculated by the target yaw rate calculation means;
wherein the yaw rate deviation calculated by the yaw rate deviation calculation means is compared to control intervention threshold values to execute an attitude control for the vehicle based on the comparison result;
estimated stability factor derivation means for deriving the stability factor by calculation during turning of the vehicle based on the behavior of the vehicle represented by parameters including at least the vehicle speed, the steering angle and the actual yaw rate, with a result of the derivation being taken as an estimated stability factor;
comparison means for comparing the estimated stability factor derived by the estimated stability factor derivation means based on at least the vehicle speed, the steering angle and the actual yaw rate which are measured at a predetermined time interval during turning of the vehicle, with the reference stability factor;
attitude control means for lowering an attitude control necessary-or-not judgment sensitivity by compensating the estimated stability factor in dependence on a comparison result obtained by the comparison means; and
wherein the attitude control means executes the attitude control for the vehicle after lowering the attitude control necessary-or-not judgment sensitivity.

9. The vehicle attitude control device as set forth in claim 8, wherein the attitude control means lowers the attitude control necessary-or-not judgment sensitivity by compensating the estimated stability factor based on the result of the comparison between the estimated stability factor and the reference stability factor.

10. The vehicle attitude control device as set forth in claim 8, wherein the attitude control necessary-or-not judgment sensitivity is represented by an understeer control intervention threshold value which is one of the control intervention threshold values for judging whether or not an understeer control is necessary for the vehicle, and an oversteer control intervention threshold value which is an other of the control intervention threshold values for judging whether or not an oversteer control is necessary for the vehicle.

11. The vehicle attitude control device as set forth in claim 8, wherein the attitude control means lowers the attitude control necessary-or-not judgment sensitivity by compensating the estimated stability factor in dependence on a result of the comparison by the comparison means.

* * * * *